US012216416B2

(12) United States Patent
Ueji et al.

(10) Patent No.: US 12,216,416 B2
(45) Date of Patent: Feb. 4, 2025

(54) IMAGE FORMING APPARATUS

(71) Applicant: BROTHER KOGYO KABUSHIKI KAISHA, Nagoya (JP)

(72) Inventors: Masaki Ueji, Nagoya (JP); Shougo Sato, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/454,955

(22) Filed: Aug. 24, 2023

(65) Prior Publication Data

US 2024/0103402 A1 Mar. 28, 2024

(30) Foreign Application Priority Data

Sep. 22, 2022 (JP) ................................ 2022-151722

(51) Int. Cl.
*G03G 15/08* (2006.01)

(52) U.S. Cl.
CPC ................................ *G03G 15/0886* (2013.01)

(58) Field of Classification Search
CPC ........... G03G 15/0886; G03G 21/1676; G03G 2215/0692; G03G 21/105; G03G 21/12; G03G 15/0875
See application file for complete search history.

(56) References Cited

U.S. PATENT DOCUMENTS

2011/0262188 A1 10/2011 Awano
2017/0219960 A1* 8/2017 Sato .................. G03G 15/0879
2021/0349409 A1* 11/2021 Sato .................. G03G 15/0865
2022/0011715 A1* 1/2022 Oh .................... G03G 15/0891

FOREIGN PATENT DOCUMENTS

JP 2008-175985 A 7/2008
JP 2011-232399 A 11/2011
JP 2015-225306 A 12/2015
JP 2016-177115 A 10/2016
JP 2018-156027 A 10/2018

* cited by examiner

*Primary Examiner* — Jessica L Eley
(74) *Attorney, Agent, or Firm* — Merchant & Gould P.C.

(57) ABSTRACT

An image forming apparatus includes a main-body housing, a drum unit, and a toner cartridge. The drum unit includes a photosensitive drum, a drum frame, a developing roller, a toner-inlet shutter to open and close a toner-inlet opening, a cleaning member, and a collected-toner outlet shutter to open and close a collected-toner outlet opening. The toner cartridge includes a toner casing having a toner container and a collected-toner container, and a shutter-driving member having a transmission device and an operable device. The transmission device is movable by the operable device between a first position, at which the toner-inlet shutter and the collected-toner outlet shutter are located at positions to close the toner-inlet opening and the collected-toner outlet opening, and a second position, at which the toner-inlet shutter and the collected-toner outlet shutter are located at positions to open the toner-inlet opening and the collected-toner outlet opening.

14 Claims, 17 Drawing Sheets

IMAGE FORMING APPARATUS

REFERENCE TO RELATED APPLICATIONS

This application claims priority from Japanese Patent Application No. 2022-151722 filed on Sep. 22, 2022. The entire content of the priority application is incorporated herein by reference.

BACKGROUND ART

A known image forming apparatus includes a main-body housing, a drum unit, and a toner cartridge. The drum unit is located inside the main-body housing. The drum unit may have a photosensitive drum, a drum frame, a developing roller, a toner-inlet shutter, and a cleaning member. The toner-inlet shutter may open or close a toner-inlet opening.

The toner cartridge is mountable in and demountable from the main-body housing. The toner cartridge may have a toner container and a collected-toner container. The toner container may contain toner to be supplied to the photosensitive drum. The collected-toner container may contain the toner collected from the photosensitive drum.

DESCRIPTION

When the toner cartridge is being mounted in the main-body housing of the image forming apparatus, before the toner cartridge is completely mounted in the main-body housing, the toner-inlet shutter may start opening the toner-inlet opening before the toner cartridge is located at a correct position with respect to the toner-inlet opening. Moreover, when the toner cartridge is being demounted from the main-body housing, the toner cartridge may start moving with respect to the main-body housing before the toner-inlet shutter completely closes the toner-inlet opening.

Therefore, when the toner cartridge is being mounted in or demounted from the main-body housing, it may be difficult to restrict the toner from scattering in an area around the toner-inlet opening.

The present disclosure is advantageous in that an image forming apparatus, in which scattering of toner in an area around a toner-inlet opening and leakage of the toner through a collected-toner-outlet opening may be reduced.

1. OVERALL CONFIGURATION OF IMAGE FORMING APPARATUS

With reference to FIGS. 1-4, an overall configuration of an image forming apparatus 1 will be described below. In the following paragraphs, a term "vertical direction" refers to an upright direction in a state where the image forming apparatus 1 is situated on a horizontal plane.

Figure 1:
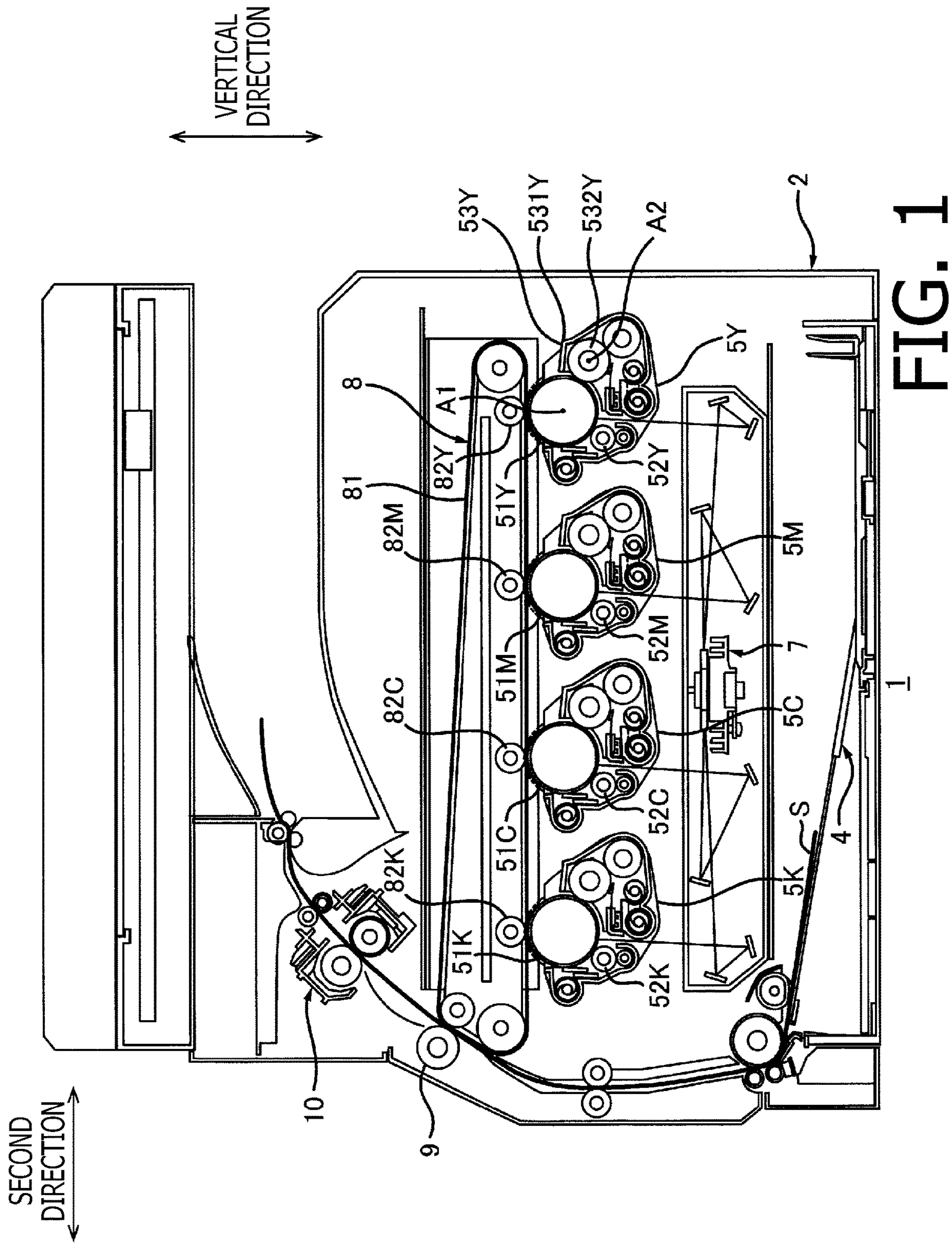
FIG. 1 is an illustrative overall view of an image forming apparatus.

As shown in FIG. 1, the image forming apparatus 1 may print images in multiple colors. The image forming apparatus 1 includes a main-body housing 2, a cover 3 (see FIG. 2), a sheet container 4, a plurality of drum units 5Y, 5M, 5C, 5K, a plurality of toner cartridges 6Y (see FIG. 2), 6M, 6C, 6K, an exposure device 7, an intermediate transfer unit 8, a transfer roller 9, and a fuser 10. The toner cartridges 6M, 6C, 6K may be referred to herein and below for easier explanation but are not in not shown in the drawings.

1.1 Main-Body Housing 2

As shown in FIG. 1, the main-body housing 2 accommodates the sheet container 4, the drum units 5Y, 5M, 5C, 5K, the toner cartridges 6Y (see FIG. 2), 6M, 6C, 6K, the exposure device 7, the intermediate transfer unit 8, the transfer roller 9, and the fuser 10.

Figure 3:
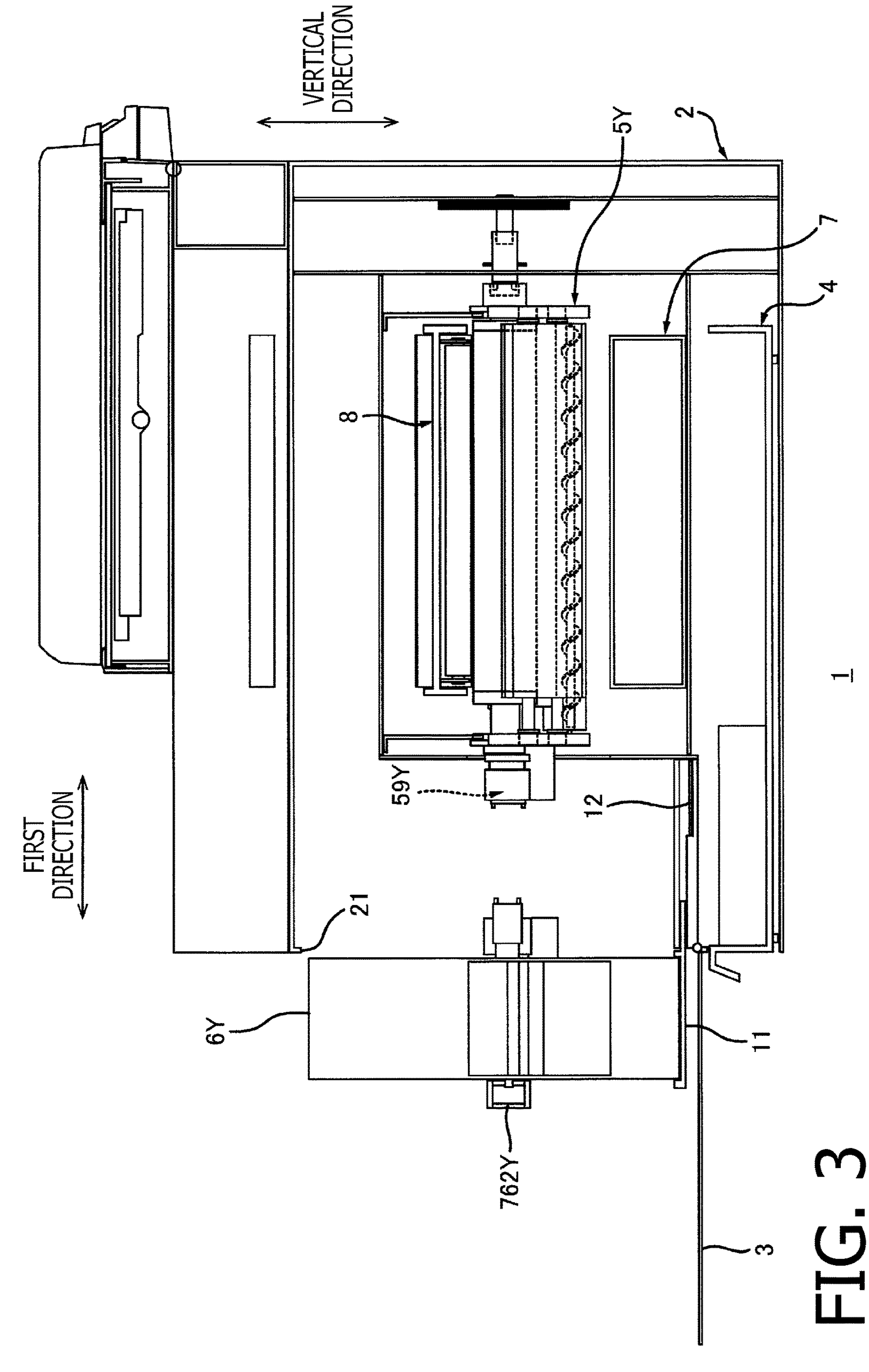
FIG. 3 is an illustrative view of the image forming apparatus with the toner cartridge demounted from the main-body housing.

As shown in FIG. 3, the main-body housing 2 has a main-body opening 21. The main-body opening 21 is located in an area in the main-body housing 2 on an end of the main-body housing 2 on one side in a first direction.

1.2 Cover 3

Figure 2:
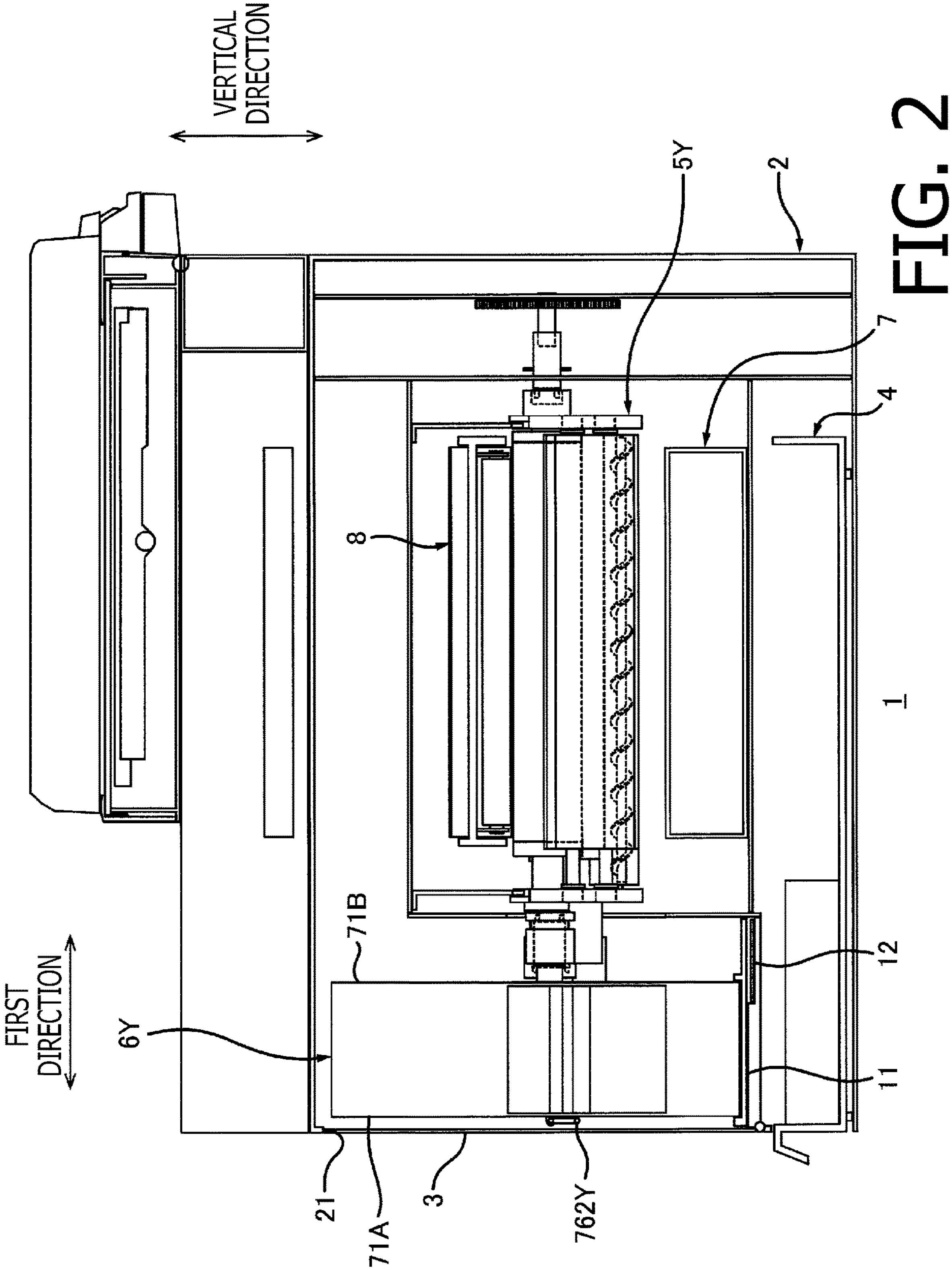
FIG. 2 is an illustrative view of a drum unit and a toner cartridge mounted in a main-body housing in the image forming apparatus.

As shown in FIGS. 2 and 3, the cover 3 may move between a closed position (see FIG. 2) and an open position (see FIG. 3). When the cover 3 is located at the closed position, as shown in FIG. 2, the cover 3 may close the main-body opening 21. When the cover 3 is located at the open position, as shown in FIG. 3, the cover 3 may open the main-body opening 21.

1.3 Sheet Container 4

As shown in FIG. 1, the sheet container 4 may contain one or more sheets S. The sheets S contained in the sheet container 4 may be conveyed toward the transfer roller 9.

1.4 Drum Units 5Y, 5M 5C, 5K

The drum units 5Y, 5M 5C, 5K are located inside the main-body housing 2. The drum units 5Y, 5M 5C, 5K align in a second direction, which intersects with the first direction. Preferably, the second direction may intersect orthogonally with the first direction. The drum units 5Y, 5M, 5C, 5K are in a same structure; therefore, in the following paragraphs, while the drum unit 5Y will be described in detail, description of the drum units 5M, 5C, 5K will be omitted.

The drum unit 5Y is a drum cartridge mountable in and demountable from the main-body housing. 2. Optionally, the drum unit 5Y may not be demountable from the main-body housing 2 but may be mounted in the main-body housing 2 undemountably. In a state where the drum unit 5Y is mounted in the main-body housing 2, the drum unit 5Y is located between the exposure device 7 and the intermediate transfer unit 8 in the vertical direction. In the state where the drum unit 5Y is mounted in the main-body housing 2, the drum unit 5Y is located above the exposure device 7.

Figure 4:
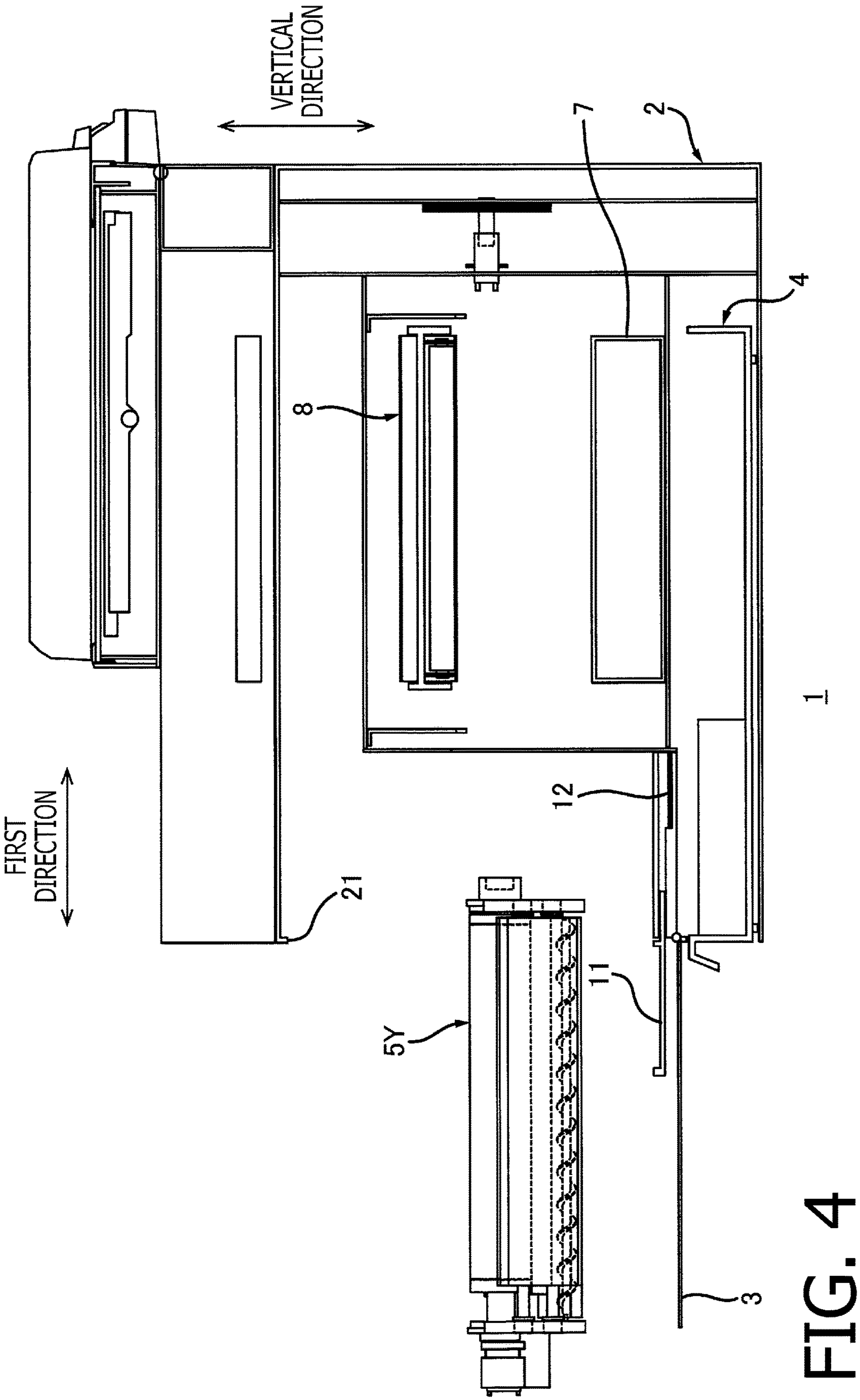
FIG. 4 is an illustrative view of the image forming apparatus with the drum unit demounted from the main-body housing.

As shown in FIG. 4, in the state where the cover 3 is located at the open position, with the toner cartridge 6Y demounted from the main-body housing 2, the drum unit 5Y is mountable in and demountable from the main-body housing 2 in the first direction through the main-body opening 21.

As shown in FIG. 1, the drum unit 5Y includes a photosensitive drum 51Y, a charger 52Y, and a developing unit 53Y 1.4.1 Photosensitive Drum 51Y The photosensitive drum 51Y is rotatable on a drum axis A1. In the state where the drum unit 5Y is mounted in the main-body housing 2, the drum axis A1 extends in the first direction. The photosensitive drum 51Y extends in the first direction. The photosensitive drum 51Y has a cylindrical form.

1.4.2 Charger 52Y

The charger 52Y may charge the photosensitive drum 51Y. The charger 52Y may be, for example, a charging roller. The charger 52Y may be, for example, a scorotron-styled charger.

1.4.3 Developing Unit 53Y

The developing unit 53Y may supply toner to a circumferential surface of the photosensitive drum 51Y having been exposed to light from the exposure device 7. The developing unit 53Y has a developer casing 531Y and a developing roller 532Y. In other words, the drum unit 5Y has a developer casing 531Y and a developing roller 532Y.

The developer casing 531Y may contain the toner to be supplied to the circumferential surface of the photosensitive drum 51Y. The developer casing 531Y supports the developing roller 532Y.

The developing roller 532Y may supply the toner in the developer casing 531Y to the photosensitive drum 51Y. The developing roller 532Y is in contact with the photosensitive drum 51Y. Optionally, the developing roller 532Y may be separable from the photosensitive drum 51Y. The developing roller 532Y extends in the first direction. The developing roller 532Y is rotatable on a developer axis A2. In the state where the drum unit 5Y is mounted in the main-body housing 2, the developer axis A2 extends in the first direction.

1.5 Toner Cartridges 6Y, 6M, 6C, 6K

As shown in FIG. 2, the toner cartridge 6Y is mountable in and demountable from main-body housing 2. In particular, in the state where the cover 3 is located at the open position, with the drum unit 5Y mounted in the main-body housing 2, as shown in FIG. 3, the toner cartridge 6Y is movable in the first direction to be mounted in and demounted from the main-body housing 2 through the main-body opening 21. The toner cartridge 6Y is mountable in and demountable from the main-body housing 2 by moving with respect to the drum unit 5Y in the first direction. The toner cartridge 6Y may contain the toner. As shown in FIG. 2, in the state where the drum unit 5Y and the toner cartridge 6Y are mounted in the main-body housing 2, the toner cartridge 6Y is connected with the drum unit 5Y in the first direction.

Meanwhile, in a state where the drum unit 5M (see FIG. 1) and the toner cartridge 6M (not shown) are mounted in the main-body housing 2, the toner cartridge 6M is connected with the drum unit 5M in the first direction. In a state where the drum unit 5C (see FIG. 1) and the toner cartridge 6C (not shown) are mounted in the main-body housing 2, the toner cartridge 6C is connected with the drum unit 5C in the first direction. In a state where the drum unit 5K (see FIG. 1) and the toner cartridge 6K (not shown) are mounted in the main-body housing 2, the toner cartridge 6K is connected with the drum unit 5K in the first direction. Each of the toner cartridges 6M, 6C, 6K is in the same structure as the toner cartridge 6Y.

1.6 Exposure Device 7

As shown in FIG. 1, in the state where the drum units 5Y, 5M, 5C, 5K are mounted in the main-body housing 2, the exposure device 7 is located on a lower side of the drum units 5Y, 5M, 5C, 5K. In the state where the drum units 5Y, 5M, 5C, 5K are mounted in the main-body housing 2, the exposure device 7 may emit exposure light at the circumferential surface of the photosensitive drum 51Y charged by the charger 52Y, a circumferential surface of the photosensitive drum 51M charged by the charger 52M, a circumferential surface of the photosensitive drum 51C charged by the charger 52C, and a circumferential surface of the photosensitive drum 51K charged by the charger 52K. The exposure device 7 may be, for example, a laser scanner unit. For another example, the exposure device 7 may be LED heads.

1.7 Intermediate Transfer Unit 8

In the state where the drum units 5Y, 5M, 5C, 5K are mounted in the main-body housing 2, the intermediate transfer unit 8 is located on an upper side of the drum units 5Y, 5M, 5C, 5K. The intermediate transfer unit 8 has an intermediate transfer belt 81 and transfer rollers 82Y, 82M, 82C, 82K.

In the state where the drum units 5Y, 5M, 5C, 5K are mounted in the main-body housing 2, the intermediate transfer belt 81 is in contact with the photosensitive drums 51Y, 51M, 51C, 51K.

The transfer roller 82Y may serve to transfer the toner on the photosensitive drum 51Y to the intermediate transfer belt 81. The transfer roller 82M may serve to transfer the toner on the photosensitive drum 51M to the intermediate transfer belt 81. The transfer roller 82C may serve to transfer the toner on the photosensitive drum 51C to the intermediate transfer belt 81. The transfer roller 82K may serve to transfer the toner on the photosensitive drum 51K to the intermediate transfer belt 81.

1.8 Transfer Roller 9

The transfer roller 9 may serve to transfer the toners on the intermediate transfer belt 81 to the sheet S. In particular, the sheet S fed from the sheet container 4 to the transfer roller 9 may be conveyed, through a position between the transfer roller 9 and the intermediate transfer belt 81, to the fuser 10. In the meantime, the transfer roller 9 may serve to transfer the toners on the intermediate transfer belt 81 to the sheet S.

1.9 Fuser 10

The fuser 10 may apply heat and pressure to the sheet S to fix the toners transferred thereon. The sheet S exiting the fuser 10 may be ejected on an upper face of the main-body housing 2.

2. DETAILS OF DRUM UNIT 5Y

Detailed configuration of the drum unit 5Y will be described below with reference to FIGS. 5-12.

Figure 5:
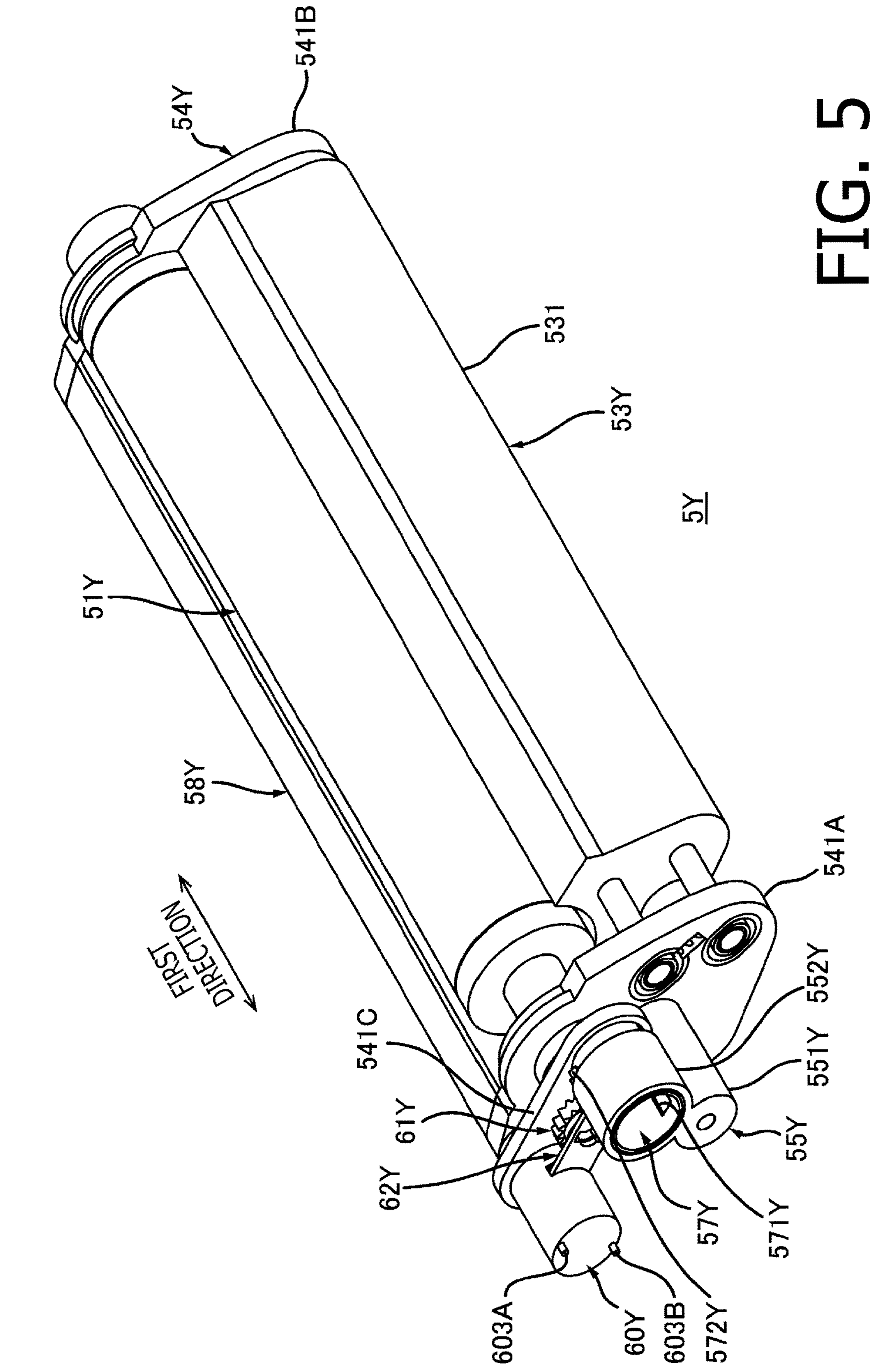
FIG. 5 is a perspective view of the drum unit.
Figure 9:
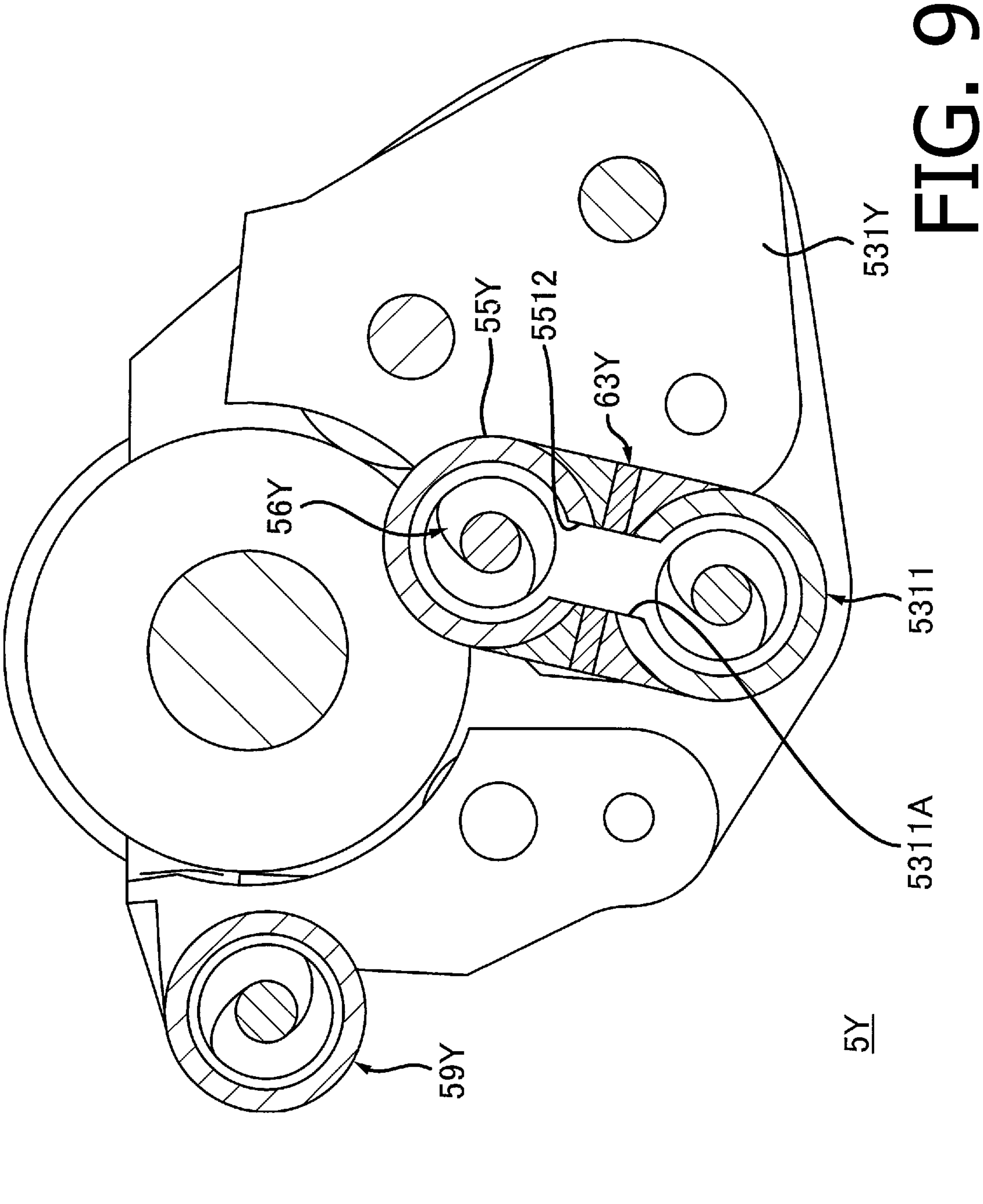
FIG. 9 is a cross-sectional view of the drum unit sectioned at a line C-C indicated in FIG. 6.

As shown in FIG. 5, the drum unit 5Y includes a drum frame 54Y, a toner tube 55Y, a first conveying member 56Y (see FIG. 10), a toner-inlet shutter 57Y, a drum cleaner 58Y, an outlet 59Y (see FIG. 10), a collected-toner outlet shutter 60Y, a transmission member 61Y, a locking member 62Y, and a sealing member 63Y (see FIG. 9).

2.1 Drum Frame 54Y

Figure 6:
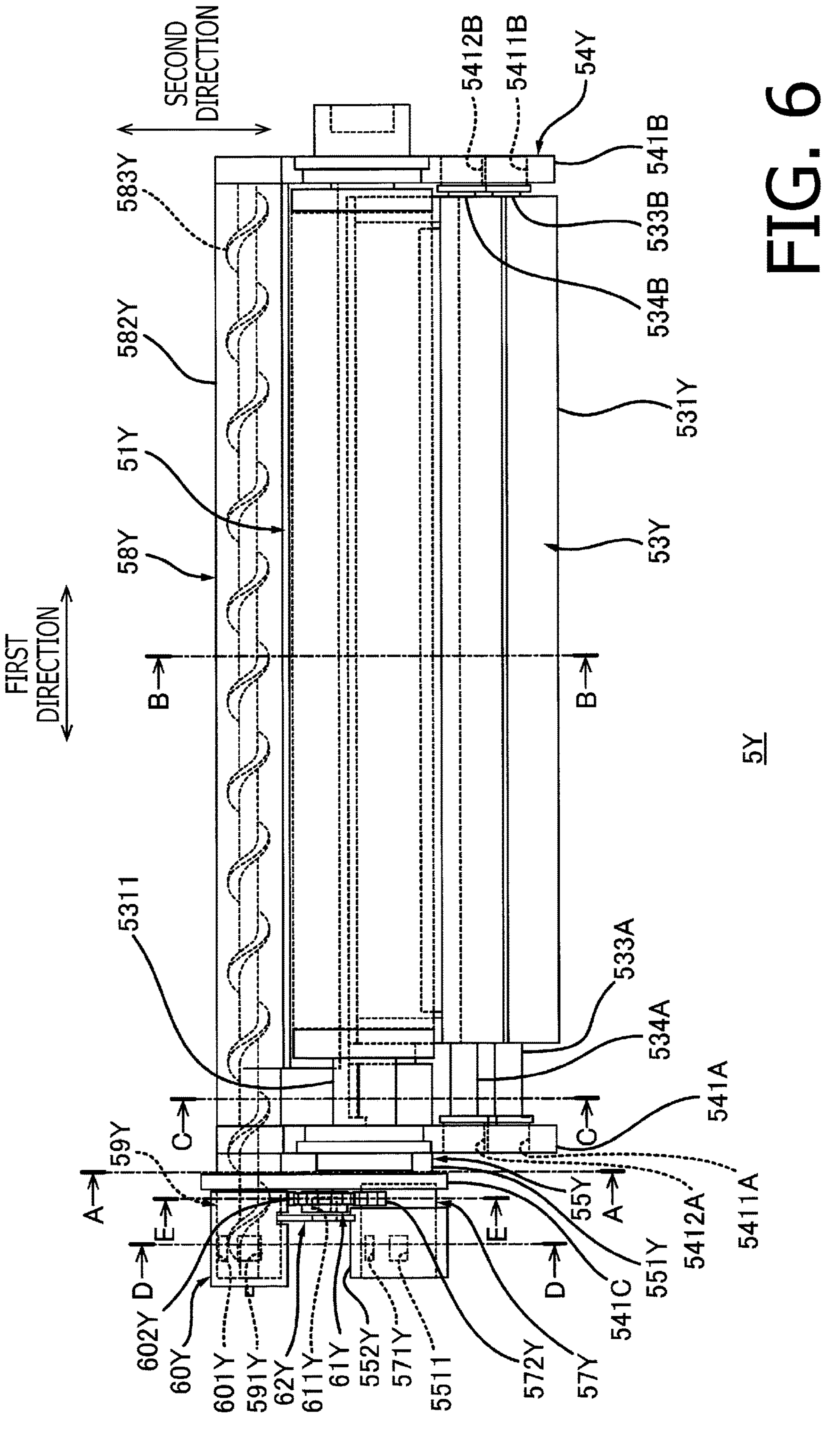
FIG. 6 is a plan view of the drum unit.

The drum frame 54Y supports the photosensitive drum 51Y rotatably. As shown in FIG. 6, the drum frame 4Y has a first side plate 541A, a second side plate 541B, and a third side plate 541C.

2.1.1 First Side Plate 541A

Figure 7:
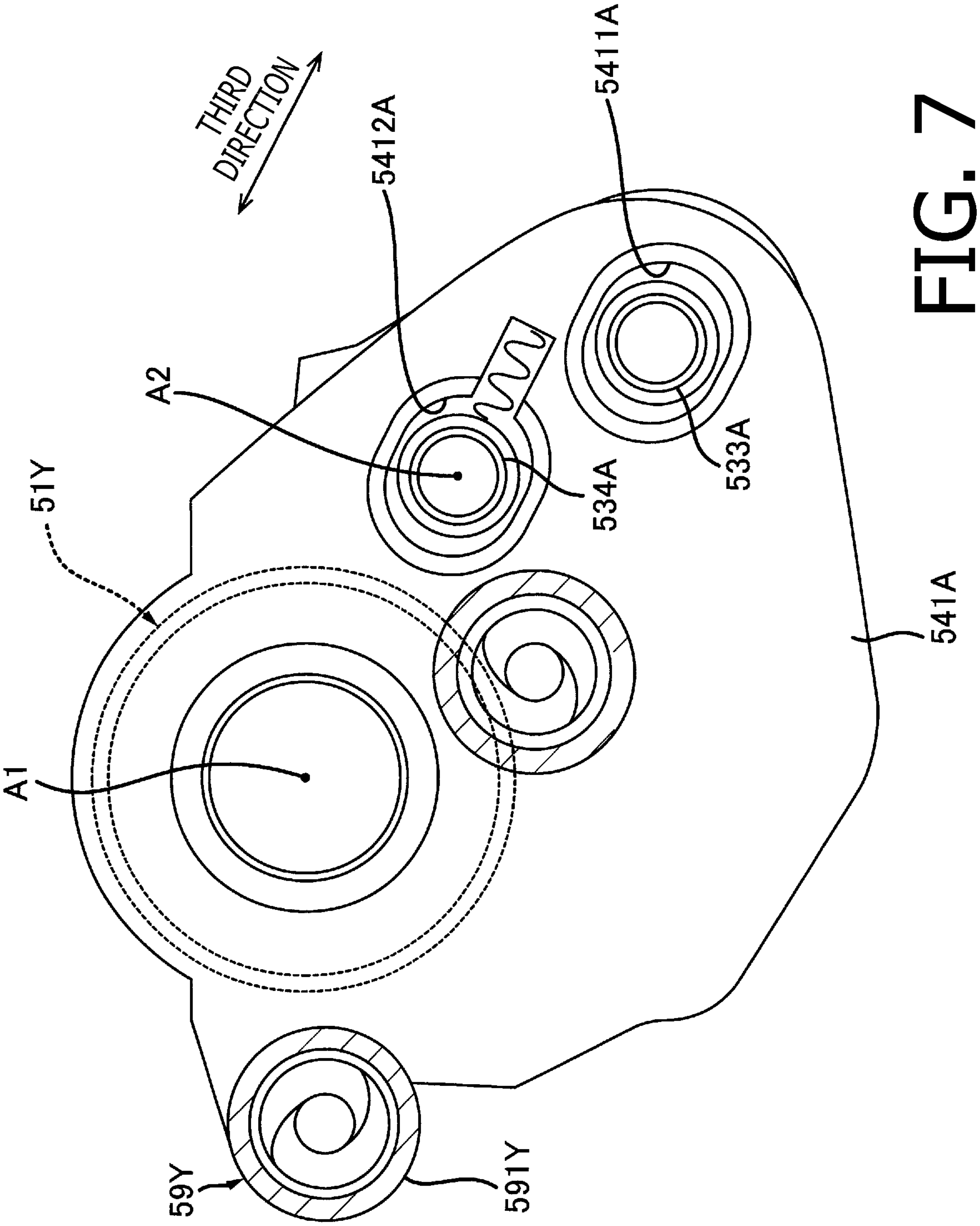
FIG. 7 is a cross-sectional view of the drum unit sectioned at a line A-A indicated in FIG. 6.

The first side plate 541A is located at one end of the drum frame 54Y on the one side in the first direction. The first side plate 541A extends in a direction intersecting with the first direction. Preferably, the first side plate 541A extends in a direction intersecting orthogonally with the first direction. The first side plate 541A supports one end of the photosensitive drum 51Y on the one side in the first direction. As shown in FIG. 7, the first side plate 541A has two (2) through-holes 5411A, 5412A.

The through-hole 5411A is located apart from the photosensitive drum 51Y in a third direction. The third direction is a direction of a line connecting the drum axis A1 and the developer axis A2. The through-hole 5411A extends in the third direction. The through-hole 5411A is an ellipse-formed hole.

The through-hole 5412A is located between the through-hole 5411A and the photosensitive drum 51Y in the third direction. The through-hole 5412A is located apart from the through-hole 5411A in the third direction. The through-hole 5412A extends in the third direction. The through-hole 5412A is an ellipse-formed hole.

2.1.2 Second Side Plate 541B

As shown in FIG. 6, the second side plate 541B is located on the other end of the drum frame 54Y on the other side in the first direction. The second side plate 541B is located apart from the first side plate 541A in the first direction. The second side plate 541B extends in a direction intersecting with the first direction. Preferably, the second side plate 541B extends in the direction intersecting orthogonally with the first direction. The second side plate 541B supports the other end of the photosensitive drum 51Y on the other side in the first direction. The second side plate 541B has two (2) through-holes 5411B, 5412B.

The through-hole 5411B is located at the same position in the third direction (see FIG. 7) as the through-hole 5411A in the first side plate 541A apart from the photosensitive drum 51Y. The through-hole 5411B extends in the third direction. The through-hole 5411B is an ellipse-formed hole.

The through-hole 5412B is located at the same position in the third direction as the through-hole 5412A in the first side plate 541A apart from the photosensitive drum 51Y. The through-hole 5412B is located apart from the through-hole 5411B in the third direction. The through-hole 5412B extends in the third direction. The through-hole 5412B is an ellipse-formed hole.

2.1.3 Third Side Plate 541C

The third side plate 541C is located on the one side of the drum frame 54Y in the first direction. The third side plate 541C extends in a direction intersecting with the first direction. Preferably, the third side plate 541C extends in the direction intersecting orthogonally with the first direction. The third side plate 541C is located farther than the first side plate 541A from the second side plate 541B in the first direction. The third side plate 41C is located on a side of the first side plate 541A opposite to the second side plate 541B in the first direction.

2.2 Details of Developing Unit 53Y

As shown in FIG. 5, the developing unit 53Y is located between the first side plate 541A and the second side plate 541B in the first direction. As shown in FIG. 6, the developing unit 53Y has, further to the developer casing 531Y and the developing roller 532Y (see FIG. 8), two (2) protrusions 533A, 534A and two (2) protrusions 533B, 534B.

2.2.1 Details of Developer Casing 531Y

Figure 8:
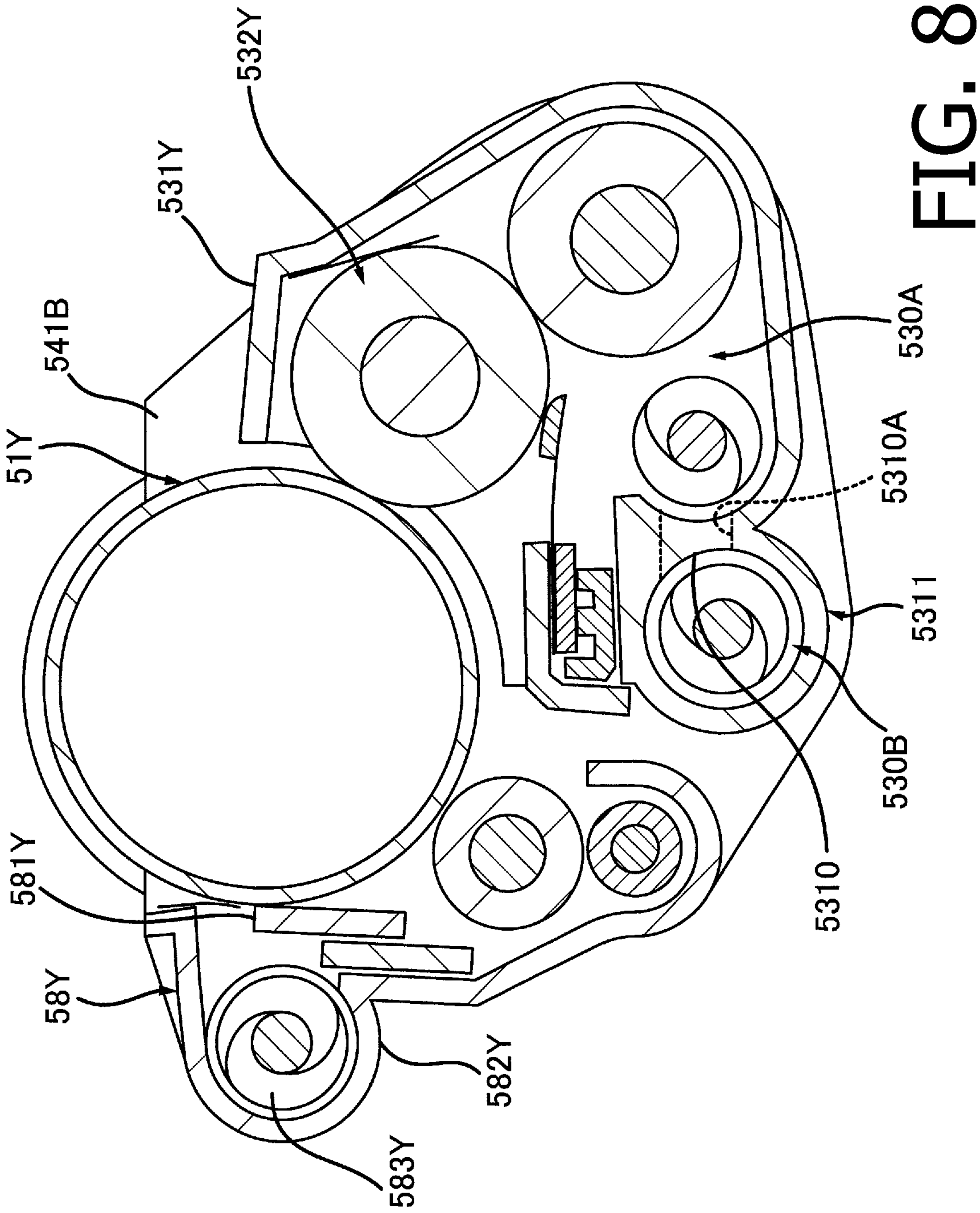
FIG. 8 is a cross-sectional view of the drum unit sectioned at a line B-B indicated in FIG. 6.

The developer casing 531Y is located between the first side plate 541A and the second side plate 541B in the first direction. The developer casing 531Y extends in the first direction. As shown in FIG. 8, the developer casing 531 has a divider wall 5310 and an inlet 5311 (see FIG. 9).

The divider wall 5310 divides a space inside the developer casing 531Y into a first developing compartment 530A and a second developing compartment 530B. In other words, the developer casing 531Y has a first developing compartment 530A and a second developing compartment 530B. The first developing compartment 530A accommodates a part of the developing roller 532A. The second developing compartment 53B may contain toner to be supplied to the first developing compartment 530A. The divider wall 5310 has a flow-in port 5310A. The toner in the second developing compartment 530B may enter the first developing compartment 530A through the flow-in port 5310A.

As shown in FIG. 6, the inlet 5311 is located at one end of the developer casing 531Y on the one side in the first direction. The inlet 5311 extends in the first direction. The inlet 5311 has a cylindrical form. A space inside the inlet 5322 is continuous with the second developing compartment 530B (see FIG. 8). As shown in FIG. 9, the inlet 5311 has an inlet opening 5311A. Through the inlet opening 5311A, toner from the toner tube 55Y may be received in the developer casing 531Y.

2.2.2 Protrusions 533A, 534A

As shown in FIG. 6, the protrusion 533A is located on one end of the developing unit 53Y on the one side in the first direction. The protrusion 533A extends in the first direction. According to the present embodiment, the protrusion 533A extends outward from an outer surface of the developer casing 531 on the one side in the first direction. Optionally, the protrusion 533A may be attached to the outer surface of the developer casing 531 on the one side in the first direction. As shown in FIG. 7, the protrusion 533A is located apart from the photosensitive drum 51Y in the third direction. The protrusion 533A has a cylindrical form. The protrusion 533A is located in the through-hole 5411A in the first side plate 541A.

As shown in FIG. 6, the protrusion 534A is located on the one end of the developing unit 53Y on the one side in the first direction. The protrusion 534A extends in the first direction. For example, the protrusion 534A may be a part of a shaft of the developing roller 532Y on one end on the one side in the first direction. Optionally, for another example, the protrusion 534A may extend outward from the outer surface of the developer casing 531 on the one side in the first direction. Optionally, the protrusion 534A may be attached to the outer surface of the developer casing 531 on the one side in the first direction. As shown in FIG. 7, the protrusion 534A is located between the photosensitive drum 51Y and the protrusion 533A. The protrusion 534A has a cylindrical form. The protrusion 534A is located in the through-hole 5412A in the first side plate 541A.

2.2.3 Protrusions 533B, 534B

As shown in FIG. 6, the protrusion 533B is located on the other end of the developing unit 53Y on the other side in the first direction. The protrusion 533B is located in the through-hole 5411B in the second side plate 541B. The protrusion 533B is in the same form as the protrusion 533A; therefore, detailed description of the protrusion 533B is herein omitted.

The protrusion 534B is located on the other end of the developing unit 53Y on the other side in the first direction. The protrusion 534B is located in the through-hole 5412B in the second side plate 541B. The protrusion 534B is in the same form as the protrusion 534A; therefore, detailed description of the protrusion 534B is herein omitted.

With the protrusion 533A located in the through-hole 5411A, the protrusion 534A located in the through-hole 5412A, the protrusion 533B located in the through-hole 5411B, and the protrusion 534B located in the through-hole 5412B, the developing unit 53Y is supported by the drum frame 54Y. The developing unit 53Y is movable with respect to the photosensitive drum 51Y in the third direction. In other words, the developer casing 531Y is movable with respect to the photosensitive drum 51Y.

2.3 Toner Tube 55Y

As shown in FIG. 5, the toner tube 55Y is located on one end of the drum unit 5Y on the one side in the first direction. The toner tube 55Y extends in the first direction. The toner tube 55Y has a toner-tube body 551Y and a shutter-supporting portion 552.

2.3.1 Toner-Tube Body 551Y

The toner-tube body 551Y extends in the first direction. The toner-tube body 551Y has a cylindrical form. The toner-tube body 551Y extends through the first side plate 541A. The toner-tube body 551Y is supported by the first side plate 541A. One end of the toner-tube body 551Y in the first direction is located on a side of the first side plate 541A opposite to the developer casing 531. The other end of the toner-tube body 551Y in the first direction is located between the developer casing 531Y and the first side plate 541A. The toner-tube body 551Y has a toner-inlet opening 5511 (see FIG. 6) and a toner-supplying opening 5512 (see FIG. 9). In other words, the toner tube 55Y has a toner-inlet opening 5511 and a toner-supplying opening 5512. The toner tube 55Y allows the toner to travel therein from the toner-inlet opening 5511 to the toner-supplying opening 5512.

Figure 10:
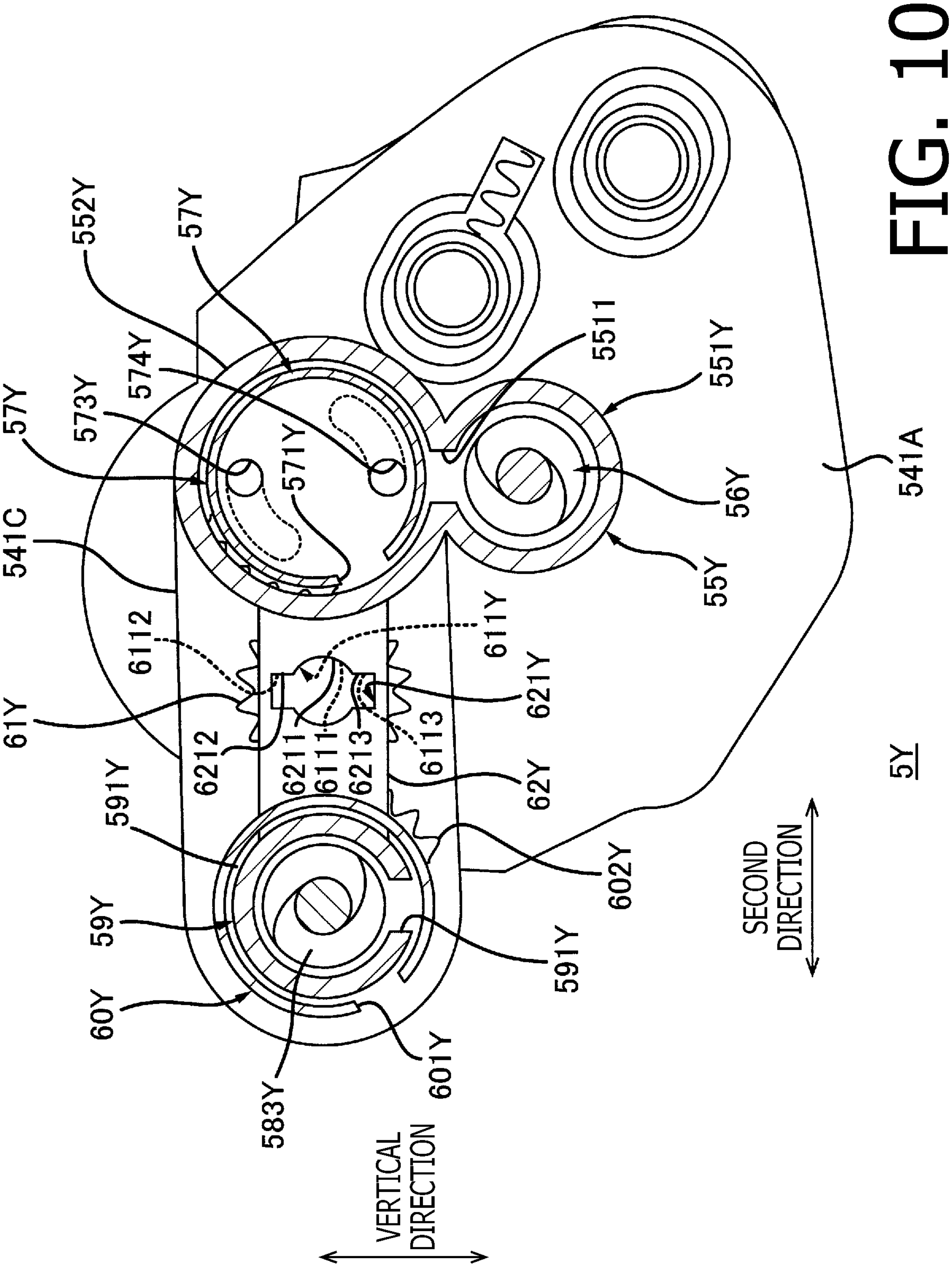
FIG. 10 is a cross-sectional view of the drum unit sectioned at a line D-D indicated in FIG. 6 with a transmission member located at a transmission-member first position.

As shown in FIG. 6, the toner-inlet opening 5511 is located in an area on one end of the toner tube 55Y in the first direction. The toner-inlet opening 5511 is located on a side of the first side plate 541A opposite to the developer casing 531Y in the first direction. As shown in FIG. 10, the toner-inlet opening 5511 is continuous with a space inside the toner-tube body 551Y. In the state where the drum unit 5Y and the toner cartridge 6Y are mounted in the main-body housing 2, the toner from the toner cartridge 6Y (see FIG. 2) may be received in the toner tube 55Y through the toner-inlet opening 5511.

As shown in FIG. 9, the toner-supplying opening 5512 is located in an area on the other end of the toner tube 55Y in the first direction. The toner-supplying opening 5512 is located between the first side plate 541A (see FIG. 6) and the developer casing 531Y (see FIG. 6) in the first direction. The toner-supplying opening 5512 is located on the same side of the first side plate 541A of the drum frame 54Y as the developer casing 531Y. The toner-supplying opening 5512 is continuous with the inlet opening 5311A of the developer casing 531Y. The space inside the toner-tube body 551Y is continuous with a space inside the inlet 5311 of the developer casing 531Y through the toner-supplying opening 5512 and the inlet opening 5311A. Therefore, the toner may be supplied from the toner tube 55Y through the toner-supplying opening 5512 to the developer casing 531Y.

2.3.2 Sutter Supporting Portion 552Y

As shown in FIG. 5, the shutter-supporting portion 552Y aligns with the toner-tube body 551Y in a radial direction of the toner-tube body 551Y. The shutter-supporting portion 552Y extends in the first direction. The shutter-supporting portion 552Y has a cylindrical form. The shutter-supporting portion 552Y is connected to a circumferential surface of the toner-tube body 551Y. The shutter-supporting portion 552Y supports the toner-inlet shutter 57Y. The shutter-supporting portion 552Y supports one end of the third side plate 541C on the one side of the first side plate 541A.

2.4 First Conveying Member 56Y

As shown in FIG. 10, the first conveying member 56Y is located inside the toner tube 55Y. In particular, the first conveying member 56Y is located inside the toner-tube body 551Y. The first conveying member 56Y may convey the toner in the toner-tube body 551Y toward the toner-supplying opening 5512 (see FIG. 9). The first conveying member 56Y extends in the first direction. The first conveying member 56Y may be, for example, an auger screw.

2.5 Toner-Inlet Shutter 57Y

As shown in FIG. 5, the toner-inlet shutter 57Y is located on the one end of the drum unit 5Y on the one side in the first direction. The toner-inlet shutter 57Y is located inside the shutter-supporting portion 552Y. The toner-inlet shutter 57Y may open or close the toner-inlet opening 5511. The toner-inlet shutter 57Y extends in the first direction. The toner-inlet shutter 57Y has a cylindrical form. The toner-inlet shutter 57Y is rotatable between a position, at which the toner-inlet shutter 57Y closes the toner-inlet opening 5511 (see FIG. 10), and a position, at which the toner-inlet shutter 57Y opens the toner-inlet opening 5511 (see FIG. 11). The toner-inlet shutter 57Y has an opening 571Y, a gear portion 572Y (see FIG. 12), and two (2) holes 573Y, 574Y (see FIG. 12).

2.5.1 Opening 571Y

Figure 11:
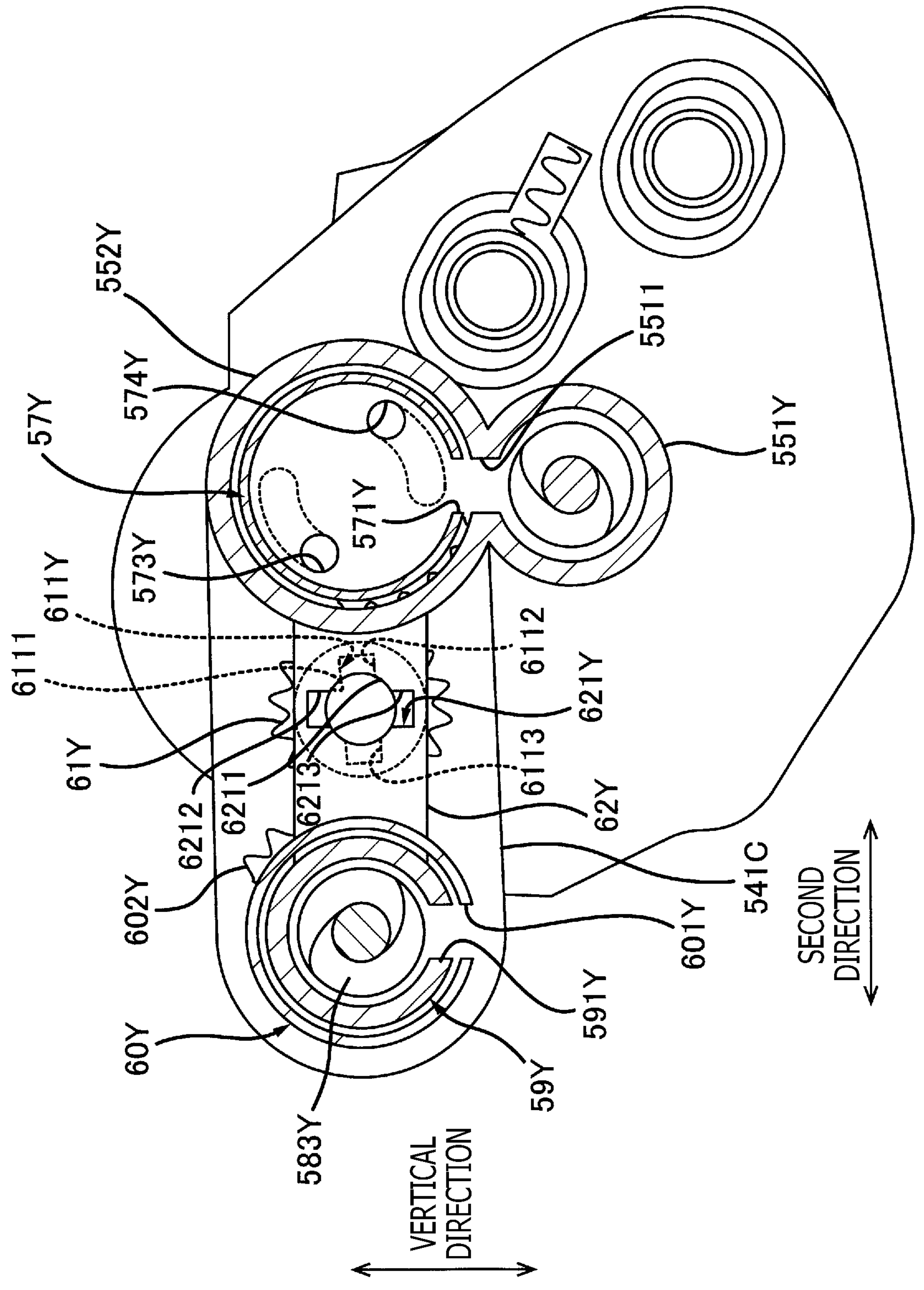
FIG. 11 is a cross-sectional view of the drum unit sectioned at the line D-D indicated in FIG. 6 with the transmission member located at a transmission-member second position.

The opening 571Y is formed through a circumference surface of the toner-inlet shutter 57Y. As shown in FIG. 10, in a state where the toner-inlet shutter 57Y closes the toner-inlet opening 5511, the opening 571Y is not connected with the toner-inlet opening 5511. As shown in FIG. 11, in a state where the toner-inlet shutter 57Y opens the toner-inlet opening 5511, the opening 571Y is continuous with the toner-inlet opening 5511.

2.5.2 Gear Portion 572Y

Figure 12:
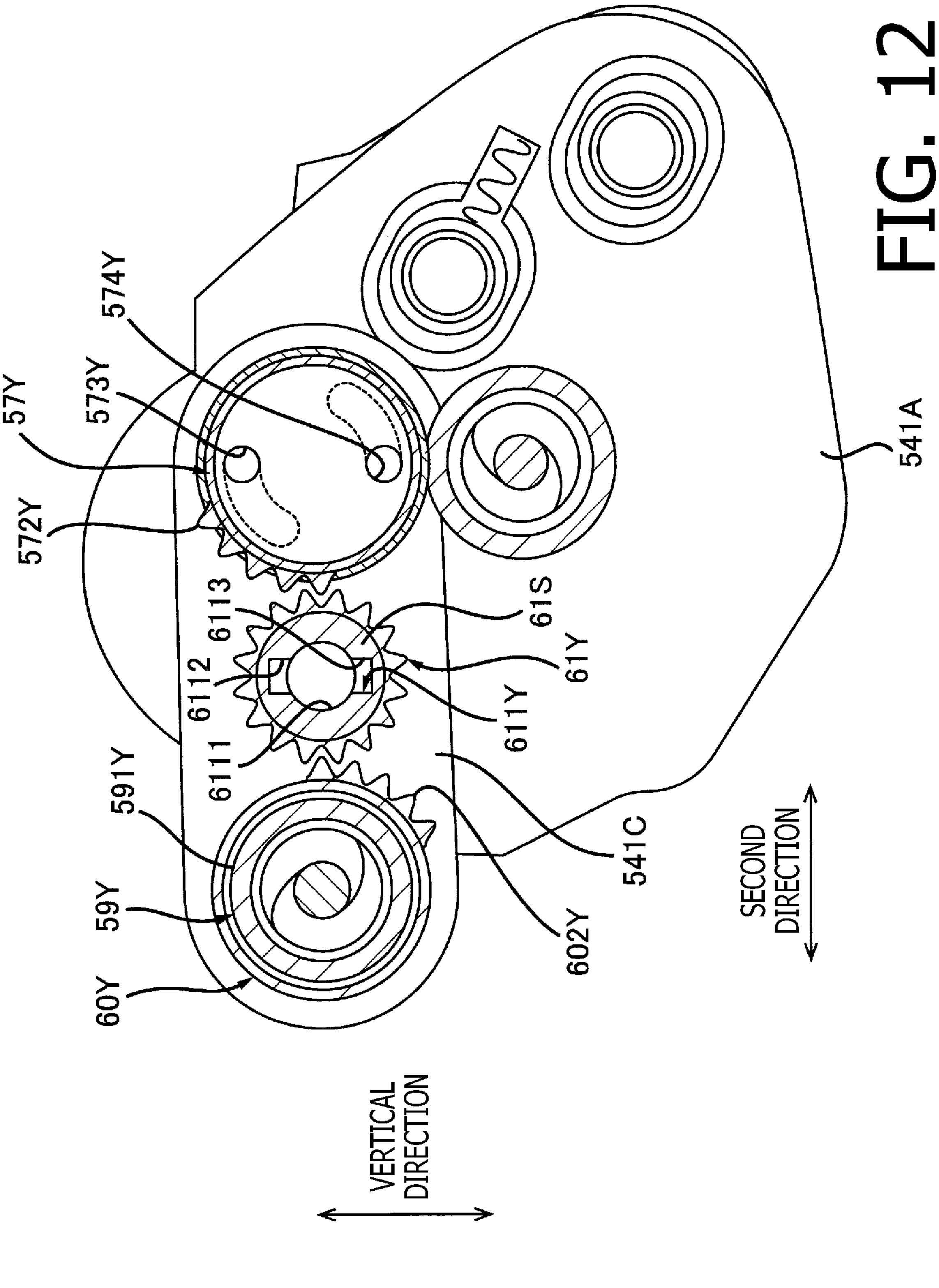
FIG. 12 is a cross-sectional view of the drum unit sectioned at a line E-E indicated in FIG. 6.

As shown in FIG. 6, the gear portion 572Y is located on an end of the toner-inlet shutter 57Y toward the other side in the first direction. The gear portion 572Y is located outside the shutter-supporting portion 552Y. The gear portion 572Y is located between the toner-inlet shutter 57Y and the third side plate 541C in the first direction. Moreover, the gear portion 572Y is located between the shutter-supporting portion 552Y and the third side plate 541C in the first direction. The gear portion 572Y is located apart from the opening 571Y in the first direction. As shown in FIG. 12, the gear portion 572Y is located on a circumferential surface of the toner-inlet shutter 57Y. The gear portion 572Y has gear teeth. The gear teeth protrude from the circumferential surface of the toner-inlet shutter 57Y. The gear teeth align along a rotating direction of the toner-inlet shutter 57Y. Optionally, the gear teeth may be attached to the circumferential surface of the toner-inlet shutter 57Y 2.5.3 Holes 573Y, 574Y The hole 573Y is located on the end of the toner-inlet shutter 57Y toward the other side in the first direction. The hole 573Y is formed through an inner face of the toner-inlet shutter 57Y.

The hole 574Y is located on the end of the toner-inlet shutter 57Y toward the other side in the first direction. The hole 573Y is formed through the inner face of the toner-inlet shutter 57Y. The hole 574Y is located apart from the hole 573Y a radial direction of the toner-inlet shutter 57Y 2.6 Drum Cleaner 58Y As shown in FIG. 6, the drum cleaner 58Y is located between the first side plate 541A and the second side plate 541B in the first direction. The drum cleaner 58Y may clean the circumferential surface of the photosensitive drum 51Y. As shown in FIG. 8, the drum cleaner 58Y includes a cleaning member 581Y, a cleaner casing 582Y, and a second conveying member 583Y. In other words, the drum unit 5Y has a cleaning member 581Y 2.6.1 Cleaning Member 581Y The cleaning member 581Y may clean the circumferential surface of the photosensitive drum 51Y. The cleaning member 581Y may collect the toner remaining on the circumferential surface of the photosensitive drum 51Y without being transferred from the photosensitive drum 51Y to the intermediate transfer belt 81 (see FIG. 1). The toner collected by the cleaning member 581Y from the circumferential surface of the photosensitive drum 51Y will be hereafter called collected toner. The cleaning member 581Y is attached to the cleaner casing 582Y. For example, the cleaning member 581Y may be in a form of a blade. An edge of the cleaning member 581Y contacts the circumferential surface of the photosensitive drum 51Y. The cleaning member 581Y may be, or another example, a roller.

2.6.2 Cleaner Casing 582Y

As shown in FIG. 6, the cleaner casing 582Y is located between the first side plate 541A and the second side plate 541B in the first direction. The cleaner casing 582Y extends in the first direction. One end of the cleaner casing 582Y on the one side in the first direction is connected to the first side plate 541A. The other end of the cleaner casing 582Y on the other side in the first direction is connected to the second side plate 541B. The cleaner casing 582Y may store the collected toners.

2.7 Second Conveying Member 583Y

The second conveying member 583Y is located inside the cleaner casing 582Y. The second conveying member 583Y extends in the first direction. The second conveying member 583Y may convey the collected toner toward the outlet 59Y. The second conveying member 583Y extends through the first side plate 541A and the third side plate 541C. The second conveying member 583Y may be, for example, an auger screw.

2.8 Outlet 59Y

The outlet 59Y is located on the one end of the drum unit 5Y on the one side in the first direction. The outlet 59Y is located on a side of the first side plate 541A opposite to the cleaner casing 582Y. The outlet 59Y extends in the first direction. The outlet 59Y has a cylindrical form. A space inside the outlet 59Y is continuous with a space inside the cleaner casing 582Y. On end of the second conveying member 583Y on the one side in the first direction is located inside the outlet 59Y As shown in FIG. 10, the outlet 59Y has a collected-toner-outlet opening 591Y. The outlet 59Y supports the other end of the third side plate 541C toward the other side in the first direction. The outlet 59Y extends through the third side plate 541C.

2.8.1 Collected-Toner Outlet Opening 591Y

The collected-toner-outlet opening 591Y is located on a side of the first side plate 541A of the drum frame 54Y opposite to the developer casing 531Y in the first direction. The collected-toner-outlet opening 591Y is formed through a circumferential surface of the outlet 59Y. The collected-toner-outlet opening 591Y is continuous with the space inside the outlet 59Y. Through the collected-toner-outlet opening 591Y, the collected toner may be discharged outside the outlet 59Y.

2.9 Collected-Toner Outlet Shutter 60Y

As shown in FIG. 6, the collected-toner outlet shutter 60Y is located on the one end of the drum unit 5Y on the one side in the first direction. The collected-toner outlet shutter 60Y is located on a side of the first side plate 541A and the third side plate 541C opposite to the cleaner casing 582Y in the first direction. The collected-toner outlet shutter 60Y may open and close the collected-toner-outlet opening 591Y. As shown in FIG. 10, the collected-toner outlet shutter 60Y is located on the circumferential surface of the outlet 59Y. The collected-toner outlet shutter 60Y has a cylindrical form. The collected-toner outlet shutter 60Y extends in the first direction. As shown in FIGS. 10 and 11, the collected-toner outlet shutter 60Y is rotatable between a position, at which the collected-toner outlet shutter 60Y closes the collected-toner-outlet opening 591Y (see FIG. 10), and a position, at which the collected-toner outlet shutter 60Y opens the collected-toner-outlet opening 591Y (see FIG. 11). As shown in FIG. 11, the collected-toner outlet shutter 60Y has an opening 601Y, a gear portion 602Y, and two (2) engaging portions 603A, 603B (see FIG. 5).

2.9.1 Opening 601Y

The opening 601Y is formed through a circumferential surface of the collected-toner outlet shutter 60Y. As shown in FIG. 10, in the state where the collected-toner outlet shutter 60Y closes the collected-toner-outlet opening 591Y, the opening 601Y is not continuous with the collected-toner-outlet opening 591Y. As shown in FIG. 11, in the state where the collected-toner outlet shutter 60Y opens the collected-toner-outlet opening 591Y, the opening 601Y is continuous with the collected-toner-outlet opening 591.

2.9.2 Gear Portion 602Y

As shown in FIG. 6, the gear portion 602Y is located on an end of the collected-toner outlet shutter 60Y toward the other side in the first direction. The gear portion 602Y is located apart from the opening 601Y in the first direction. The gear portion 602Y is located on the side of the first side plate 541A and the third side plate 541C opposite to the cleaner casing 582Y in the first direction. As shown in FIG. 12, the gear portion 602Y is located on the circumferential surface of the collected-toner outlet shutter 60Y. The gear portion 602Y has gear teeth protruding from the circumferential surface of the collected-toner outlet shutter 60Y. The gear teeth align along a rotating direction of the collected-toner outlet shutter 60Y. The gear teeth are attached to the circumferential surface of the collected-toner outlet shutter 60Y 2.9.3 Engaging Portions 603A, 603B As shown in FIG. 5, the engaging portion 603A is located on one end of the collected-toner outlet shutter 60Y on the one side in the first direction. The engaging portion 603A is located on an outer surface of the collected-toner outlet shutter 60Y. The engaging portion 603A in the present embodiment is a protrusion. The engaging portion 603A protrudes in the first direction.

The engaging portion 603B is located on the one end of the collected-toner outlet shutter 60Y on the one side in the first direction. The engaging portion 603B is located on the outer surface of the collected-toner outlet shutter 60Y. The engaging portion 603B is located apart from the engaging portion 603A in a radial direction of the collected-toner outlet shutter 60Y. The engaging portion 603B in the present embodiment is a protrusion. The engaging portion 603B protrudes in the first direction.

2.10 Transmission Member 61Y

As shown in FIG. 12, the transmission member 61Y is located between the toner-inlet shutter 57Y and the collected-toner outlet shutter 60Y in the second direction. The transmission member 61Y is located on a side of the third side plate 541C opposite to the first side plate 541A in the first direction. The transmission member 61Y may be, for example, a gear. The transmission member 61Y meshes with the gear portion 572Y and the gear portion 602Y. In other words, the transmission member 61Y is coupled to both the toner-inlet shutter 57Y and the collected-toner outlet shutter 60Y. The gear portion 572Y meshes with the transmission member 61Y. The gear portion 602Y meshes with the transmission member 61Y.

The transmission member 61Y is rotatably supported by a rotation shaft of the third side plate 541C. The rotation shaft of the third side plate 541C is not shown in the drawings.

Optionally, the transmission member 61Y may be a pulley. In the case where the transmission member 61Y is a pulley, in place of the gear portion 672, a belt may be strained around the transmission member 61Y and the circumferential surface of the toner-inlet shutter 57Y; and in place of the gear portion 602Y, a belt may be strained around the transmission member 61Y and the circumferential surface of the collected-toner outlet shutter 60Y Optionally, for another example, the transmission member 61Y may be a link. In the case where the transmission member 61Y is a link, in place of the gear portion 572, the drum unit 5Y may be provided with a first coupler that couples a part of the circumferential surface of the toner-inlet shutter 57Y with a part of the transmission member 61Y; and in place of the gear portion 602Y, the drum unit 5Y may be provided with a second coupler that couples a part of the collected-toner outlet shutter 60Y with a part of the transmission member 61Y.

As shown in FIGS. 10 and 11, by rotating the transmission member 61Y, the toner-inlet shutter 57Y may move between a position, at which the toner-inlet shutter 57Y closes the toner-inlet opening 5511 (see FIG. 10), and a position, at which the toner-inlet shutter 57Y opens the toner-inlet opening 5511 (see FIG. 11). By rotating the transmission member 61Y, further, the collected-toner outlet shutter 60Y may move between a position, at which the collected-toner outlet shutter 60Y closes the collected-toner-outlet opening 591Y (see FIG. 10), and a position, at which the collected-toner outlet shutter 60Y opens the collected-toner outlet opening 591Y (see FIG. 11).

The transmission member 61Y is rotatable between a transmission-member first position (see FIG. 10) and a transmission-member second position (see FIG. 11).

As shown in FIG. 10, in the state where the transmission member 61Y is located at the transmission-member first position, the toner-inlet shutter 57Y is located at the position to close the toner-inlet opening 5511, and the collected-toner outlet shutter 60Y is located at the position to close the collected-toner-outlet opening 591Y.

As shown in FIG. 11, in the state where the transmission member 61Y is located at the transmission-member second position, the toner-inlet shutter 57Y is located at the position to open the toner-inlet opening 5511, and the collected-toner outlet shutter 60Y is located at the position to open the collected-toner-outlet opening 591Y.

The transmission member 61Y has a recess 611Y.

2.10.1 Recess 611Y

As shown in FIG. 12, the recess 611Y is formed to dent in a direction intersecting orthogonally with the first direction. In the state where the toner cartridge 6Y and the drum unit 5Y are mounted in the main-body housing 2, the recess 611Y fits with a transmission device 761Y of the toner cartridge 6Y. The transmission device 761Y will be described further below. The form of the recess 611Y may not necessarily be limited as long as the transmission member 61Y is rotatable along with the transmission device 761Y in a state where the transmission device 761Y of the toner cartridge 6Y fits in the recess 611Y. In the present embodiment, the recess 611Y has a first part 6111 and two (2) second parts 6112, 6113.

2.10.2 First Part 6111

The first part 6111 is located at a center in a radial direction of the transmission member 61Y. The first part 6111 may have, for example, a circular form.

2.10.3 Second Parts 6112, 6113

The second part 6112 is located on one side of the first part 6111 in the radial direction of the transmission member 61Y. The second part 6112 is continuous with the first part 6111. The second part 6112 extends in the radial direction of the transmission member 61Y. The second part 6112 has a rectangular form.

The second part 6113 is located on the other side of the first part 6111 opposite to the second part 6112 in the radial direction of the transmission member 61Y. The second part 6113 is continuous with the first part 6111. The second part 6113 extends in the radial direction of the transmission member 61Y. The second part 6113 has a rectangular form.

2.11 Locking Member 62Y

As shown in FIG. 6, the locking member 62Y is located on a side of the transmission member 61Y opposite to the first side plate 541A in the first direction. The locking member 62Y extends in a direction intersecting with the first direction. In particular, the locking member 62Y may extend in the second direction. The locking member 62Y may have, for example, a form of a plate.

2.11.1 Through-Hole 621Y

As shown in FIG. 10, the locking member 62Y has a through-hole 621Y. The through-hole 621Y is located between the toner-inlet shutter 57Y and the collected-toner outlet shutter 60Y in the second direction.

The through-hole 621Y extends in a direction intersecting orthogonally with a pass-through direction. The pass-through direction is a direction, in which the transmission device 761Y passes through the through-hole 621Y. For example, the pass-through direction may be the first direction. In particular, the through-hole has a first part 6211 and two (2) second parts 6212, 6213.

2.11.2 First Part 6211

The first part 6211 is located at a longitudinal center in a direction, in which the through-hole 621Y extends. The first part 6211 may have, for example, a circular form. The first part 6222 overlaps the first part 6111 of the transmission member 61Y in the first direction.

2.11.3 Second Parts 6212, 6213

The second part 6212 is located on one side of the first part 6211 in a radial direction of first part 6211. The second part 6212 is continuous with the first part 6111. The second part 6212 extends in the radial direction of the first part 6211. The second part 6212 has a rectangular form.

The second part 6213 is located on the other side of the first part 6211 opposite to the second part 6212 in the radial direction of first part 6211. The second part 6213 is continuous with the first part 6111. The second part 6213 extends in the radial direction of the first part 6211. The second part 6213 has a rectangular form.

As shown in FIG. 10, in the state where the transmission member 61Y is located at the transmission-member first position, the second part 6112 of the transmission member 61Y overlaps the second part 6212 of the locking member 62Y in the first direction, and the second part 6113 of the transmission member 61Y overlaps the second part 6213 of the locking member 62Y in the first direction.

As shown in FIG. 11, in the state where the transmission member 61Y is located at the transmission-member second position, the second part 6112 of the transmission member 61Y is displaced from the second parts 6212, 6213 of the locking member 62Y in the rotating direction of the transmission member 61Y, and the second part 6113 of the transmission member 61Y is displaced from the second parts 6212, 6213 of the locking member 62Y in the rotating direction of the transmission member 61Y. Therefore, in the state where the transmission member 61Y is located at the transmission-member second position, the second part 6112 of the transmission member 61Y does not overlap the second part 6212 or the second part 6213 of the locking member 62Y in the first direction, and the second part 6113 of the transmission member 61Y does not overlap the second part 6212 or the second part 6213 of the locking member 62Y in the first direction.

2.12 Sealing Member 63Y

As shown in FIG. 9, the sealing member 63Y is located between the inlet 5311 and the other end of the toner tube 55Y in the first direction. The sealing member 63Y is located around the inlet opening 5311A of the inlet 5311 and around the toner-supplying opening 5512 of the toner tube 55Y. The sealing member 63Y seals a gap between the inlet 5311 and the other end of the toner tube 55Y in the first direction. The sealing member 63Y is elastically deformable according to the developing unit 53Y moving with respect to the photosensitive drum 51Y. The sealing member 63Y may consist of, for example, sponge.

3. DETAILS OF TONER CARTRIDGE 6Y

With reference to FIGS. 2 and 13-17, a detailed configuration of the toner cartridge 6Y will be described below. In the following context, a vertical direction, a first direction, and a second direction refer to directions concerning the toner cartridge 6Y in the state where the toner cartridge 6Y and the drum unit 5Y are mounted in the main-body housing 2.

Figure 13:
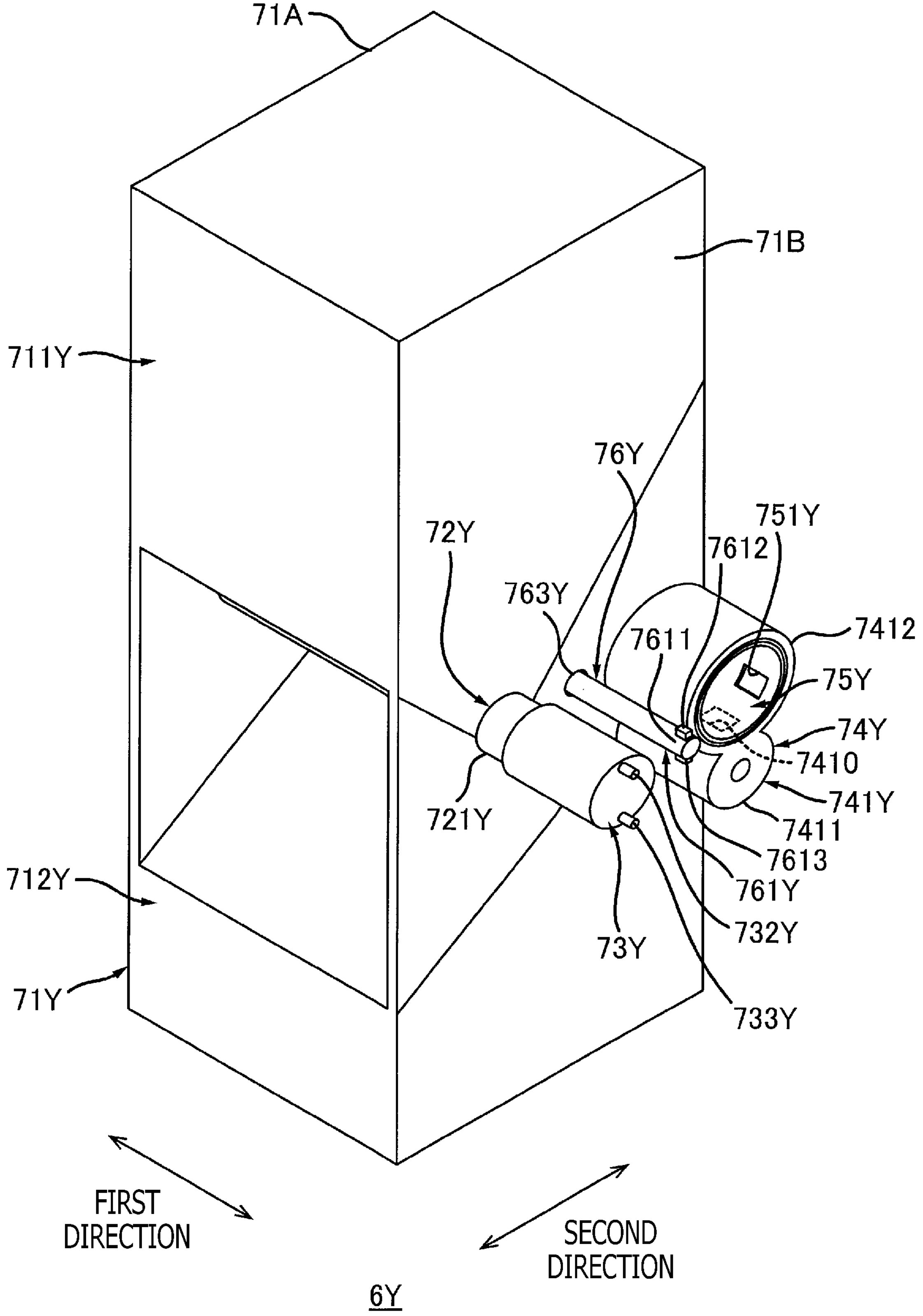
FIG. 13 is a perspective view of the toner cartridge.

As shown in FIG. 13, the toner cartridge 6Y has a toner casing 71Y, a toner outlet 72Y, a toner-outlet shutter 73Y, a collected-toner inlet 74Y, a collected-toner inlet shutter 75Y, and a shutter-driving member 76Y.

3.1 Toner Casing 71Y

Figure 14:
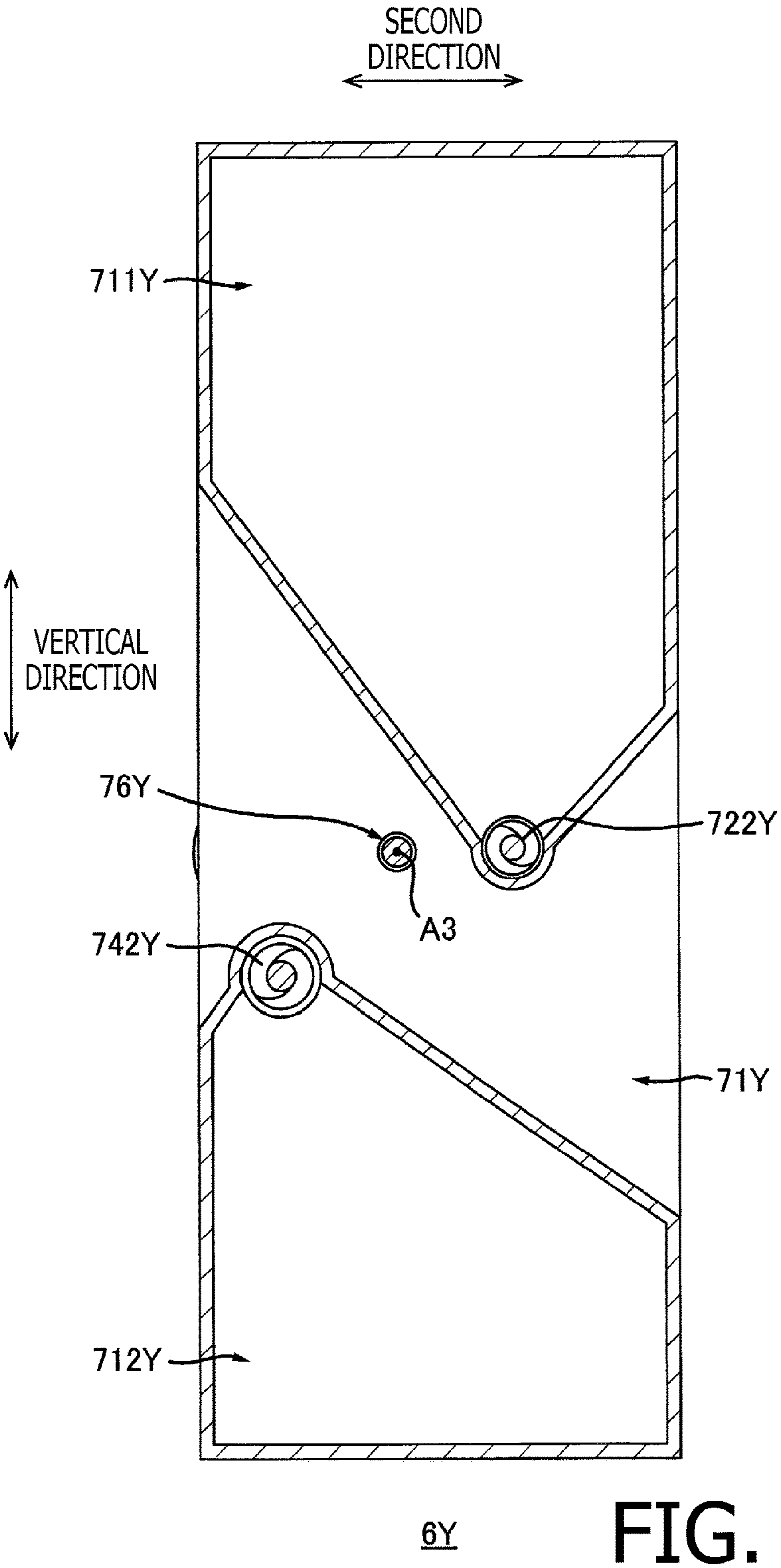
FIG. 14 is a cross-sectional view of the toner cartridge sectioned at a line A-A indicated in FIG. 15.

The toner casing 71Y extends in the vertical direction and the first direction. The toner casing 71Y has a first face 71A and a second face 71B on one side and the other side in the first direction. As shown in FIG. 2, in the state where the toner cartridge 6Y and the drum unit 5Y are mounted in the main-body housing 2, the second face 71B is located between the first face 71A and the drum unit 5Y in the first direction. In the state where the toner casing 71Y is mounted in the main-body housing 2, the first face 71A is located on a side of the second face 71B opposite to the drum unit 5Y. As shown in FIG. 14, the toner casing 71Y has a toner container 711Y and a collected-toner container 712Y.

3.1.1 Toner Container 711Y

The toner container 711Y is located above the collected-toner container 712Y. the toner container 711Y may contain the toner to be supplied to the photosensitive drum 51Y (see FIG. 5).

3.1.2 Collected-Toner Container 712Y The collected-toner container 712Y is located below and apart from the toner container 711Y. The collected-toner container 712Y may contain the collected toner.

3.2 Toner Outlet 72Y

Figure 15:
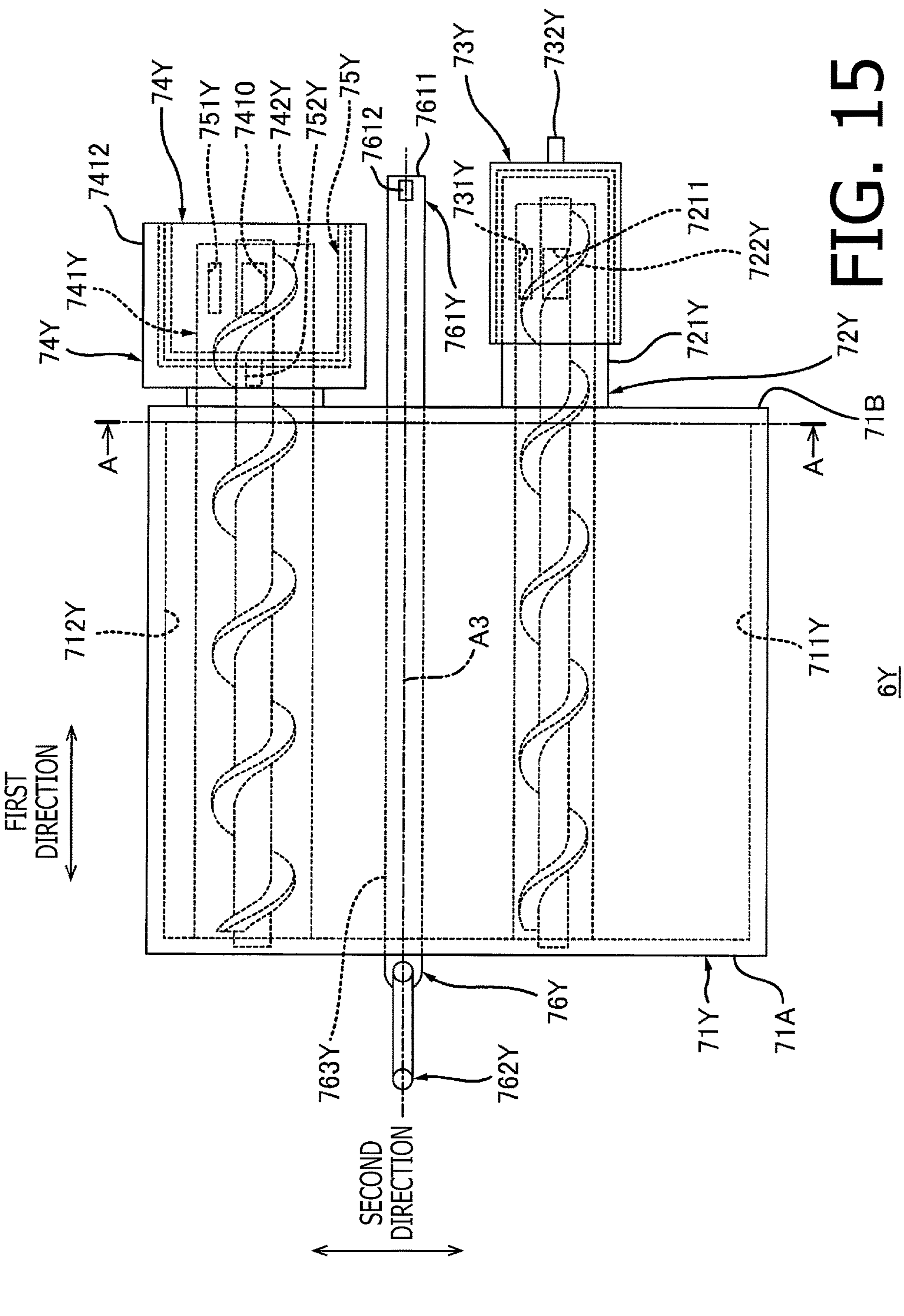
FIG. 15 is a plan view of the toner cartridge with a transmission device located at a first position.

As shown in FIG. 13, the toner outlet 72Y is located at a lower end of the toner container 711Y. Through the toner outlet 72Y, the toner in the toner container 711Y may be discharged. As shown in FIG. 15, the toner outlet 72Y has a toner-outlet tube 721Y and a third conveying member 722Y.

3.2.1 Toner-Outlet Tube 721Y

The toner-outlet tube 721Y is located on the second face 71B, i.e., on a side of the toner casing 71Y opposite to the first face 71A in the first direction. The toner-outlet tube 721Y extends in the first direction. The toner-outlet tube 721Y extends from the second face 71B. Optionally, the toner-outlet tube 721Y may be attached to the second face 71B. A space inside the toner-outlet tube 721Y is continuous with a space inside the toner container 711Y. The toner-outlet tube 721Y may have a cylindrical form. The toner-outlet tube 721Y has a toner-outlet opening 7211.

3.2.2 Toner-Outlet Opening 7211

Figure 16:
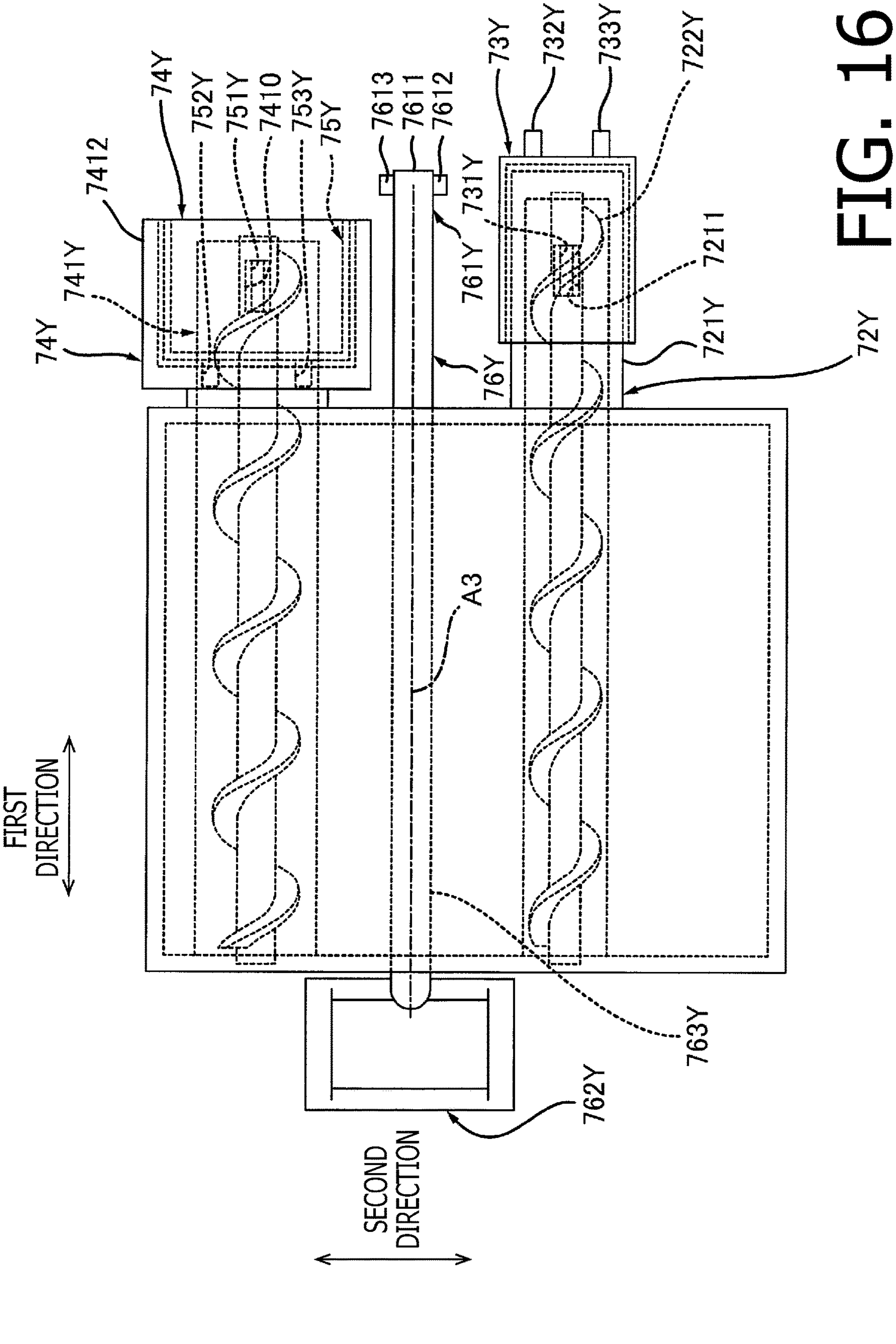
FIG. 16 is a plan view of the toner cartridge with the transmission device located at a second position.

The toner-outlet opening 7211 is formed through a circumferential surface of the toner-outlet tube 721Y. The toner-outlet opening 7211 is continuous with the space inside the toner-outlet tube 721Y. In the state where the toner cartridge 6Y and the drum unit 5Y are mounted in the main-body housing 2, and in the state where the toner-inlet shutter 57Y (see FIG. 11) and the toner-outlet shutter 73Y are open, the toner-outlet opening 7211 is continuous with the toner-inlet opening 5511 (see FIG. 11). In the state where the toner cartridge 6Y is mounted in the main-body housing 2, and in the state as shown in FIG. 16, the toner in the toner container 711Y (see FIG. 14) may be discharged through the toner-outlet opening 7211 into the toner-inlet opening 5511 of the drum unit 5Y.

3.2.3 Third Conveying Member 722Y

The third conveying member 722Y is located inside the toner-outlet tube 721Y and the toner container 711Y The third conveying member 722Y extends in the third direction. The third conveying member 722Y may convey the toner in the toner container 711Y toward the toner-outlet opening 7211. The third conveying member 722Y may be, for example, an auger screw.

3.3 Toner-Outlet Shutter 73Y

As shown in FIG. 15, the toner-outlet shutter 73Y is located on an end of the toner cartridge 6Y toward the other side in the first direction. The toner-outlet shutter 73Y is located on a side of the second face 71B opposite to the first face 71A in the first direction. The toner-outlet shutter 73Y extends in the first direction. The toner-outlet shutter 73Y has a cylindrical form. The toner-outlet shutter 73Y is located on the circumferential surface of the toner-outlet tube 721Y. The toner-outlet shutter 73Y may open and close the toner-outlet opening 7211. As shown in FIGS. 15 and 16, the toner-outlet shutter 73Y is rotatable between a position (see FIG. 15), at which the toner-outlet shutter 73Y closes the toner-outlet opening 7211, and a position (see FIG. 16), at which the toner-outlet shutter 73Y opens the toner-outlet opening 7211.

The toner-outlet shutter 73Y has an opening 731Y (see FIG. 15) and two (2) engaging portions 732Y, 733Y (see FIG. 13).

3.3.1 Opening 731Y

As shown in FIG. 15, the opening 731Y is formed through a circumferential surface of the toner-outlet shutter 73Y. The opening 731Y is, in the state where the toner-outlet shutter 73Y closes the toner-outlet opening 7211, not continuous with the toner-outlet opening 7211. As shown in FIG. 16, in the state where the toner-outlet shutter 73Y opens the toner-outlet opening 7211, the opening 731Y is continuous with the toner-outlet opening 7211.

3.3.2 Engaging Portions 732Y, 733Y

As shown in FIG. 13, the engaging portion 732Y is located on an end of the toner-outlet shutter 73Y toward the other side in the first direction. The engaging portion 732Y is located on an outer face of the toner-outlet shutter 73Y in the first direction. The engaging portion 732Y may be, for example, a protrusion. The engaging portion 732Y extends in the first direction.

The engaging portion 733Y is located on the end of the toner-outlet shutter 73Y toward the other side in the first direction. The engaging portion 733Y is located on the outer face of the toner-outlet shutter 73Y in the first direction. The engaging portion 733Y is located apart from the engaging portion 732Y in a radial direction of the toner-outlet shutter 73Y. The engaging portion 733Y may be, for example, a protrusion. The engaging portion 733Y extends in the first direction.

As shown in FIG. 2, in the state where the toner cartridge 6Y and the drum unit 5Y are mounted in the main-body housing 2, the toner-outlet shutter 73Y and the toner outlet 72Y are inserted in the toner-inlet shutter 57Y (see FIG. 10) of the drum unit 5Y. While the toner-outlet shutter 73Y and the toner outlet 72Y are inserted in the toner-inlet shutter 57Y, the toner-outlet opening 7211 is located above the toner-inlet opening 5511 (see FIG. 10) of the drum unit 5Y.

While the toner-outlet shutter 73Y and the toner outlet 72Y are inserted in the toner-inlet shutter 57Y, the engaging portion 732Y fits in the hole 573Y (see FIG. 10) in the drum unit 5Y, and the engaging portion 733Y fits in the hole 574Y (see FIG. 10) in the drum unit 5Y. Thus, the toner-outlet shutter 73Y of the toner cartridge 6Y engages with the toner-inlet shutter 57Y in the drum unit 5Y.

Accordingly, the toner-outlet shutter 73Y is, in the state where the toner cartridge 6Y and the drum unit 5Y are mounted in the main-body housing 2, movable along with the toner-inlet shutter 57Y (see FIG. 10) of the drum unit 5Y.

In particular, as shown in FIG. 15, in the state where the toner-inlet shutter 57Y (see FIG. 10) is located at the position to close the toner-inlet opening 5511 (see FIG. 10), the toner-outlet shutter 73Y is located at the position to close the toner-outlet opening 7211.

On the other hand, as shown in FIG. 16, in the state where the toner-inlet shutter 57Y (see FIG. 11) is located at the position to open the toner-inlet opening 5511 (see FIG. 11), the toner-outlet shutter 73Y is located at the position to open the toner-outlet opening 7211.

3.4 Collected-Toner Inlet 74Y

As shown in FIG. 13, the collected-toner inlet 74Y is located at an upper end of the collected-toner container 712. The collected-toner inlet 74Y is located apart from the toner outlet 72Y in the second direction. As shown in FIG. 15, the collected-toner inlet 74Y has a collected-toner inlet tube 741Y and a fourth conveying member 742Y.

3.4.1 Collected-Toner Inlet Tube 741Y

The collected-toner inlet tube 741Y is located on the second face 71B, i.e., on the side of the toner casing 71Y opposite to the first face 71A in the first direction. A space inside the collected-toner inlet tube 741Y is continuous with a space inside the collected-toner container 712. The collected-toner inlet tube 741Y may have a cylindrical form. As shown in FIG. 13, the collected-toner inlet tube 741Y has a collected-toner inlet tube body 7411 and a shutter-supporting portion 7412.

3.4.2 Collected-Toner Inlet Tube Body 7411

The collected-toner inlet tube body 7411 is located on the second face 71B, i.e., on the side of the toner casing 71Y opposite to the first face 71A in the first direction. The collected-toner inlet tube body 7411 extends from the second face 71B. Optionally, the collected-toner inlet tube body 7411 may be attached to the second face 71B. The collected-toner inlet tube body 7411 extends in the first direction. The collected-toner inlet tube body 7411 may have a cylindrical form. A space inside the collected-toner inlet tube body 7411 is continuous with a space inside the collected-toner container 712Y. The collected-toner inlet tube body 7411 has a collected-toner-inlet opening 7410.

The collected-toner-inlet opening 7410 is formed through a circumferential surface of the collected-toner inlet tube body 7411. The collected-toner-inlet opening 7410 is continuous with the space inside the collected-toner inlet tube body 7411. In the state where the toner cartridge 6Y and the drum unit 5Y are mounted in the main-body housing 2, and in a state where the collected-toner-outlet opening 591Y of the drum unit 5Y and the collected-toner-inlet opening 7410 are open, the collected toner from the outlet 59Y (see FIG. 11) of the drum unit 5Y may be received in the collected-toner inlet tube body 7411 through the collected-toner opening 7410.

3.4.3 Shutter-Supporting Portion 7412

The shutter-supporting portion 7412 aligns with the collected-toner inlet tube body 7411 in a radial direction of the collected-toner inlet tube body 7411. The shutter-supporting portion 7412 extends in the first direction. The shutter-supporting portion 7412 has a cylindrical form. The shutter-supporting portion 7412 is connected to the circumferential surface of the collected-toner inlet tube body 7411. The shutter-supporting portion 7412 supports the collected-toner inlet shutter 75Y.

3.4.4 Fourth Conveying Member 742Y

As shown in FIG. 15, the fourth conveying member 742Y is located inside the collected-toner inlet tube 741Y and the collected-toner container 712Y. The fourth conveying member 742Y extends in the first direction. The fourth conveying member 742Y may convey the collected toner from the collected-toner inlet opening 7410 (see FIG. 15) to the collected-toner container 712Y. The fourth conveying member 742Y may be, for example, an auger screw.

3.5 Collected-Toner Inlet Shutter 75Y

As shown in FIG. 13, the collected-toner inlet shutter 75Y is located on the end of the toner cartridge 6Y toward the other side in the first direction. The collected-toner inlet shutter 75Y is located inside the shutter-supporting portion 7412. The collected-toner inlet shutter 75Y has a cylindrical form. The collected-toner inlet shutter 75Y extends in the first direction. The collected-toner inlet shutter 75Y may open and close the collected-toner inlet opening 7410. As shown in FIGS. 15 and 16, the collected-toner inlet shutter 75Y is rotatable between a position (see FIG. 15), at which the collected-toner inlet shutter 75Y closes the collected-toner inlet opening 7410, and a position (see FIG. 16), at which the collected-toner inlet shutter 75Y opens the collected-toner inlet opening 7410. The collected-toner inlet shutter 75Y has an opening 751Y and two (2) holes 752Y, 753Y (see FIG. 16).

3.5.1 Opening 751Y

As shown in FIG. 15, the opening 751Y is formed through a circumferential surface of the collected-toner inlet shutter 75Y. The opening 751Y is, in the state where the collected-toner inlet shutter 75Y closes the collected-toner inlet opening 7410, not continuous with the collected-toner inlet opening 7410. As shown in FIG. 16, in the state where the collected-toner inlet shutter 75Y opens the collected-toner inlet opening 7410, the opening 751Y is continuous with the collected-toner inlet opening 7410.

3.5.2 Holes 752Y, 753Y

As shown in FIG. 16, the hole 752Y is located on an end of the collected-toner inlet shutter 75Y toward the one side in the first direction. The hole 752Y is located on an inner surface of the collected-toner inlet shutter 75Y.

The hole 753Y is located on the end of the collected-toner inlet shutter 75Y toward the one side in the first direction. The hole 753Y is located on the inner surface of the collected-toner inlet shutter 75Y. The hole 753Y is located apart from the hole 752Y in a radial direction of the collected-toner inlet shutter 75Y.

As shown in FIG. 2, in the state where the toner cartridge 6Y and the drum unit 5Y are mounted in the main-body housing 2, the collected-toner outlet shutter 60Y and the outlet 59Y (see FIG. 10) are inserted in the collected-toner inlet shutter 75Y (see FIG. 13). In this arrangement, the collected-toner inlet opening 7410 of the collected-toner inlet 74Y is located below the collected-toner outlet opening 591Y.

In the state where the collected-toner outlet shutter 60Y and the outlet 59Y are inserted in the collected-toner inlet shutter 75Y, the engaging portion 603A (see FIG. 5) of the drum unit 5Y fits in the hole 752Y, and the engaging portion 603B (see FIG. 5) of the drum unit 5Y fits in the hole 753Y. Accordingly, the collected-toner inlet shutter 75Y of the toner cartridge 6Y engages with the collected-toner outlet shutter 60Y of the drum unit 5Y.

Therefore, in the state where the toner cartridge 6Y and the drum unit 5Y are mounted in the main-body housing 2, the collected-toner inlet shutter 75Y is enabled to move along with the collected-toner outlet shutter 60Y of the drum unit 5Y.

As shown in FIG. 15, in particular, in the state where the collected-toner outlet shutter 60Y (see FIG. 10) is located at the position to close the collected-toner outlet opening 591Y (see FIG. 10), the collected-toner inlet shutter 75Y is located at the position to close the collected-toner inlet opening 7410.

As shown in FIG. 16, in the state where the collected-toner outlet shutter 60Y (see FIG. 11) is located at the position to open the collected-toner outlet opening 591Y (see FIG. 11), the collected-toner inlet shutter 75Y is located at the position to open the collected-toner inlet opening 7410.

In the state where the toner cartridge 6Y and the drum unit 5Y are mounted in the main-body housing 2, when the collected-toner inlet opening 7410 opens, the collected toner, discharged from the outlet 59Y through the collected-toner outlet opening 591Y (see FIG. 14), may be received in the collected-toner inlet tube body 7411 through the collected-toner inlet opening 7410.

3.6 Shutter-Driving Member 76Y

As shown in FIG. 14, the shutter-driving member 76Y is located between the toner container 711Y and the collected-toner container 712Y in the vertical direction. As shown in FIG. 15, the shutter-driving member 76Y is located between the toner-outlet shutter 73Y and the collected-toner inlet shutter 75Y in the second direction. The shutter-driving member 76Y has a transmission device 761Y, an operable device 762Y, and a shaft 763Y.

3.6.1 Transmission Device 761Y

The transmission device 761Y is located at a tip of the shutter-driving member 76Y. The transmission device 761Y is located on the side of the second face 71B opposite to the first face 71A in the first direction. The transmission device 761Y is located apart from the second face 71B in the first direction.

The transmission device 761Y is rotatable on an axis A3. The axis A3 extends in the first direction. The transmission device 761Y has a shaft 7611 and two (2) protrusions 7612, 7613.

3.6.1.1 Shaft 7611

The shaft 7611 extends in the first direction. The shaft 7611 has a cylindrical form.

3.6.1.2 Protrusions 7612, 7613

As shown in FIG. 16, the protrusion 7612 extends in a radial direction of the shaft 7611. The protrusion 7612 extends from a circumferential surface of the shaft 7611. Optionally, the protrusion 7612 may be attached to the circumferential surface of the shaft 7611.

The protrusion 7613 extends in the radial direction of the shaft 7611. The protrusion 7613 extends from the circumferential surface of the shaft 7611. Optionally, the protrusion 7613 may be attached to the circumferential surface of the shaft 7611. The protrusion 7613 is located on a side of the shaft 7611 opposite to the protrusion 7612.

The transmission device 761Y is movable between a first position and a second position.

As shown in FIG. 15, in a state where the transmission device 761Y is located at the first position, the protrusions 7612, 7613 both protrude from the shaft 7611 in the vertical direction. According to the present embodiment, the through-hole 621Y in the locking member 62Y extends in the vertical direction. The protrusions 7612, 7613 may protrude in a direction along the vertical direction.

Therefore, as shown in FIG. 2, in the state where the toner cartridge 6Y and the drum unit 5Y are mounted in the main-body housing 2, the transmission device 761Y passes through the through-hole 621Y of the locking member 62Y of the drum unit 5Y (see FIG. 10) and fits in the recess 611Y of the transmission member 61Y located at the transmission-member first position. In particular, the shaft 7611 fits in the first part 611 (see FIG. 12) of the transmission member 61Y, the protrusion 7612 fits in the second part 6112 of the transmission member 61Y, and the protrusion 7613 fits in the second part 6113 of the transmission member 61Y. Thus, the transmission member 61Y engages with the transmission member 61Y. In other words, in the state where the toner cartridge 6*y* is mounted in the main-body housing 2, the transmission member 61Y is engaged with the transmission device 761Y.

Therefore, in the state where the toner cartridge 6Y is mounted in the main-body housing 2, the transmission device 761Y may transmit power input thereto to the toner-inlet shutter 57Y (see FIG. 5) and the collected-toner outlet shutter 60Y (see FIG. 5).

As shown in FIG. 15, in the state where the transmission device 761Y is located at the first position, the transmission device 761Y locates the transmission member 61Y at the transmission-member first position. As described earlier, when the transmission member 61Y is located at the transmission-member first position, as shown in FIG. 10, the toner-inlet shutter 57Y is located at the position to close the toner-inlet opening 5511, and the collected-toner outlet shutter 60Y is located at the position to close the collected-toner outlet opening 591Y. In other words, in the state where the transmission device 761Y is located at the first position, the transmission device 761Y locates the toner-inlet shutter 57Y at the position to close the toner-inlet opening 5511 and locates the collected-toner outlet shutter 60Y at the position to close the collected-toner outlet opening 591Y.

On the other hand, as shown in FIG. 16, in the state where the transmission device 761Y is located at the second position, the transmission device 761Y locates the transmission member 61Y at the transmission-member second position. As described earlier, when the transmission member 61Y is located at the transmission-member second position, as shown in FIG. 11, the toner-inlet shutter 57Y is located at the position to open the toner-inlet opening 5511, and the collected-toner outlet shutter 60Y is located at the position to open the collected-toner outlet opening 591Y. In other words, in the state where the transmission device 761Y is located at the second position, the transmission device 761Y locates the toner-inlet shutter 57Y at the position to open the toner-inlet opening 5511 and locates the collected-toner outlet shutter 60Y at the position to open the collected-toner outlet opening 591Y.

Thus, in the state where the toner cartridge 6Y and the drum unit 5Y are mounted in the main-body housing 2, the shutter-driving member 76Y may drive the toner-inlet shutter 57Y (see FIG. 5) and the collected-toner outlet shutter 60Y (see FIG. 5).

Meanwhile, as shown in FIG. 16, in the state where the transmission device 761Y is located at the second position, the protrusions 7612, 1673 protrude in the second direction.

Therefore, in the state where the toner cartridge 6Y and the drum unit 5Y are mounted in the main-body housing 2, with the transmission device 761Y being located at the second position, the protrusion 7612 of the transmission device 761Y does not overlap the second part 6212 (see FIG. 11) of the through-hole 621Y in the locking member 62Y in the first direction, and the protrusion 7613 of the transmission device 761Y does not overlap the second part 6213 (see FIG. 11) of the through-hole 621Y in the locking member 62Y in the first direction.

Accordingly, in the state where the toner cartridge 6Y and the drum unit 5Y are mounted in the main-body housing 2, with the transmission device 761Y being located at the second position, when the toner cartridge 6Y moves in a demounting direction, in which the toner cartridge 6Y is demounted from the main-body housing 2, e.g., the first direction, the locking member 62Y may collide with the transmission device 761Y and stop the toner cartridge 6Y from moving further in the demounting direction.

It may be noted that the form of the transmission device 761Y may not necessarily be limited as long as the cross-sectional shape thereof has convexity or concavity. For example, a number of the protrusions may not necessarily be limited to two. For another example, the transmission device 761Y may have a polygonal cross-sectional form, and the shaft 7611 and the protrusions 7612, 7613 may be formed integrally. For another example, the transmission device 761Y may have a rectangular cross-sectional form.

3.6.2 Operable Device 762Y

Figure 17:
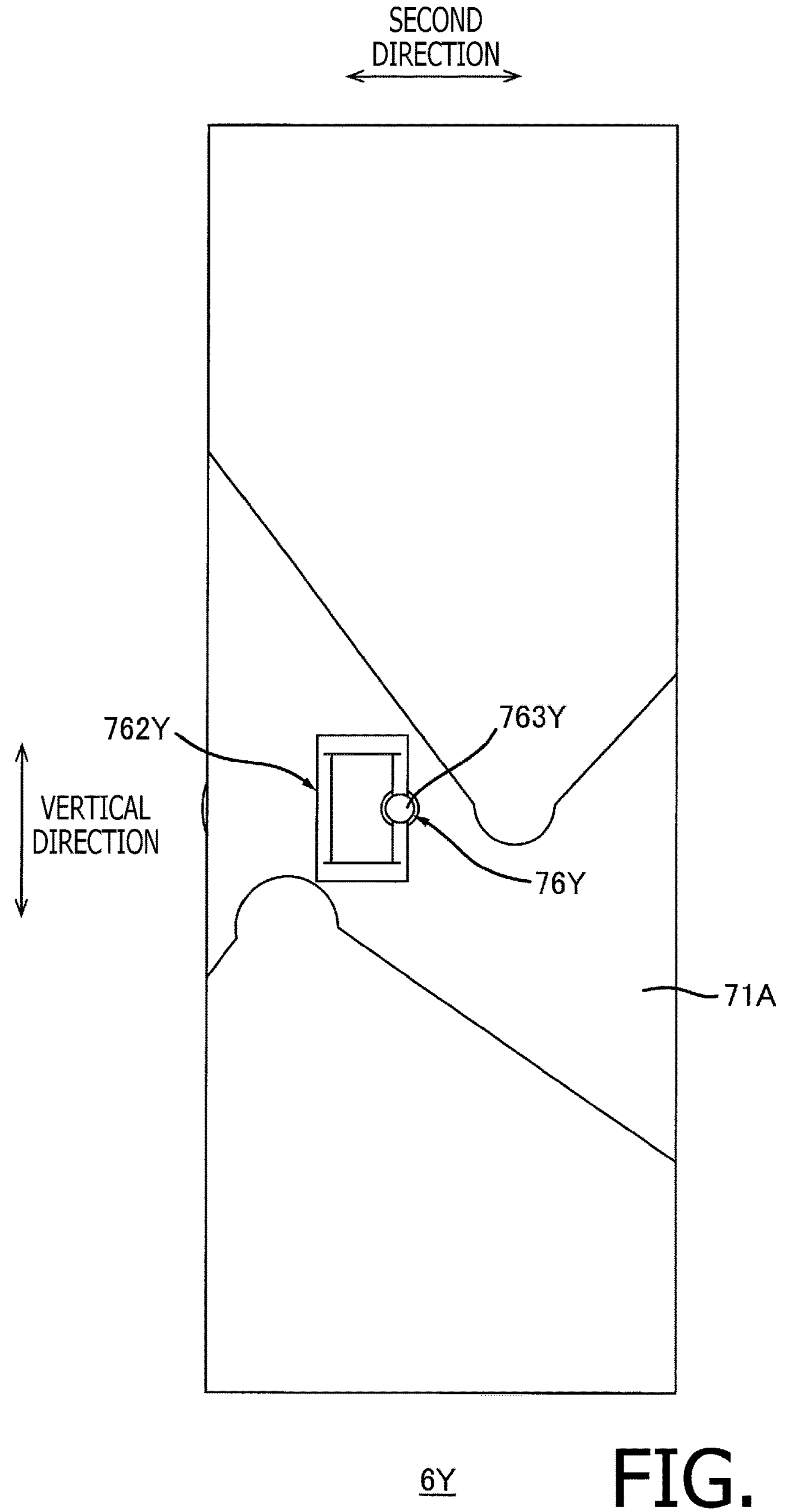
FIG. 17 is a rearward view of the toner cartridge.

As shown in FIG. 15, the operable device 762Y is located on an end of the shutter-driving member 76Y in the first direction. The operable device 762Y is located on a side of the toner casing 71Y opposite to the transmission device 761Y. The operable device 762Y may move the transmission device 761Y between the first position (see FIG. 15) and the second position (see FIG. 16). For example, the operable device 762Y may be a handle. Preferably, the operable device 762Y may be foldable, as shown in FIG. 17. In the state where the toner cartridge 6Y is mounted in the main-body housing 2, as shown in FIG. 2, the operable device 762Y is located inside the cover 3. Optionally, the operable device 762Y may be a knob in, for example, a cylindrical form.

3.6.3 Shaft 763Y

As shown in FIG. 15, the shaft 763Y extends in the first direction. The shaft 763Y penetrates the toner casing 71Y. In the present embodiment, the shaft 763Y has a cylindrical form. Meanwhile, the form of the shaft 763Y is not necessarily limited but may have, for example, a columnar form with a rectangular or C- or U-shaped cross section. The shaft 763Y is rotatable with respect to the toner casing 71Y. The shaft 763Y connects the transmission device 761 and the operable device 762Y. Optionally, a part of the shaft 763Y may form the operable device 762Y.

4. DETAILS OF IMAGE FORMING APPARATUS 1

With reference to FIGS. 2 and 3, the image forming apparatus 1 will be described in detail.

As shown in FIG. 2, the image forming apparatus 1 has a supporting member 11 and a receiver member 12.

4.1 Supporting Member 11

According to the present embodiment, the supporting member 11 is located in a lower area in the image forming apparatus 1. The supporting member 11 is located in the image forming apparatus 1 on the one side in the first direction. The supporting member 11 extends in the first direction. The supporting member 11 may be, for example, in a form of a board. The supporting member 11 may support the toner cartridge 6Y.

As shown in FIGS. 2 and 3, in the state where the supporting member 11 supports the toner cartridge 6Y, the supporting member 11 may move in the first direction between an inner position (see FIG. 2) and an outer position (see FIG. 3).

As shown in FIG. 2, in the state where the supporting member 11 is located at the inner position, the supporting member 11 locates the toner cartridge 6Y at the position inside the main-body housing 2.

As shown in FIG. 3, in the stat where the supporting member 11 is located at the outer position, the supporting member 11 locates the toner cartridge 6Y at a position outside the main-body housing 2.

4.2 Receiver Member 12

As shown in FIG. 3, the receiver member 12 is located below the outlet 59Y (see FIG. 11) of the drum unit 5Y located inside the main-body housing 2. In other words, the receiver member 12 is located below the collected-toner outlet opening 591Y (see FIG. 11) of the drum unit 5Y located inside the main-body housing 2. The receiver member 12 may receive the collected toner falling through a gap between the collected-toner outlet opening 591Y and the collected-toner inlet opening 7410 (see FIG. 15). The receiver member 12 has a form of sheet. The receiver member 12 extends in the first direction. The receiver member 12 may consist of, for example, sponge.

As shown in FIG. 2, in the state where the supporting member 11 is located at the inner position, the supporting member 11 is located between the collected-toner outlet opening 591Y (see FIG. 11) and the receiver member 12 in the vertical direction.

As shown in FIG. 3, in the state where the supporting member 11 is located at the outer position, the supporting member 11 is not located between the collected-toner outlet opening 591Y (see FIG. 11) and the receiver member 12 in the vertical direction.

5. MOUNTING AND DEMOUNTING TONER CARTRIDGE 6Y IN AND FROM MAIN-BODY HOUSING 2 WITH DRUM UNIT 5Y 5.1 Mounting Toner Cartridge 6Y in Main-Body Housing 2 with Drum Unit 5Y With reference to FIGS. 2-3 and 15, a mounting procedure of the toner cartridge 6Y in the main-body housing 2 with the drum unit 5Y will be described.

5.2 Mounting Toner Cartridge 6Y in Main-Body Housing 2

A procedure of mounting the toner cartridge 6Y in the main-body housing 2 will be described herein.

As shown in FIG. 3, in the state where the drum unit 5 is mounted in the main-body housing 2, a user may open the cover 3 and locate the supporting member 11 at the outer position.

Next, the user may place the toner cartridge 6Y on an upper face of the supporting member 11. Meanwhile, as shown in FIG. 15, the toner-outlet shutter 73Y of the toner cartridge 6Y is located at the position to close the toner-outlet opening 721, and the collected-toner inlet shutter 75Y is located at the position to close the collected-toner inlet opening 7410.

Next, as shown in FIG. 2, the user may move the supporting member 11 from the outer position to the inner position, insert the toner-outlet shutter 73Y and the toner outlet 72Y (see FIG. 15) into the toner-inlet shutter 57Y (see FIG. 5) of the drum unit 5Y, and insert the collected-toner outlet shutter 60Y (see FIG. 5) and the outlet 59Y into the collected-toner inlet shutter 75Y (see FIG. 15).

In the state where the supporting member 11 is located at the inner position, the toner-outlet opening 7211 is located above the toner-inlet opening 5511 (see FIG. 10) of the drum unit 5Y, and the collected-toner inlet opening 7410 of the collected-toner inlet 74Y is located below the collected-toner outlet opening 591Y. Further, the toner-outlet shutter 73Y (see FIG. 13) of the toner cartridge 6Y engages with the toner-inlet shutter 57Y (see FIG. 5) of the drum unit 5Y, and the collected-toner-inlet shutter 75 (see FIG. 13) of the toner cartridge 6Y engages with the collected-toner outlet shutter 60Y (see FIG. 5) of the drum unit 5Y.

Moreover, the transmission device 761Y (see FIG. 13) of the toner cartridge 6Y passing through the through-hole 621Y (see FIG. 10) of the locking member 62Y of the drum unit 5Y fits in the recess 611Y (see FIG. 12) of the transmission member 61Y.

Thereby, the toner cartridge 6Y is located at a correct position with respect to the drum unit 5Y Next, with the toner cartridge 6Y located at the correct position with respect to the drum unit 5Y, the user may rotate the operable device 762Y. Accordingly, the transmission device 761Y may rotate from the first position to the second position, and the transmission member 61Y of the drum unit 5Y may move from the transmission-member first position to the transmission-member second position.

Accordingly, the toner-inlet opening 5511 (see FIG. 11) of the drum unit 5Y opens, the toner-outlet opening 7211 (see FIG. 16) of the toner cartridge 6Y opens, the collected-toner outlet opening 591Y (see FIG. 11) of the drum unit 5Y opens, and the collected-toner inlet opening 7410 (see FIG. 16) of the toner cartridge 6Y opens.

5.3 Demounting Toner Cartridge 6Y from Main-Body Housing 2

For demounting the toner cartridge 6Y from the main-body housing 2, the user may open the cover 3 and rotate the operable device 762Y. Accordingly, the transmission device 761Y moves from the second position to the first position, and the transmission member 61Y of the drum unit 5Y moves from the transmission-member second position to the transmission-member first position.

In this arrangement, the toner-inlet shutter 57Y of the drum unit 5Y closes the toner-inlet opening 5511 (see FIG. 10), the toner-outlet shutter 73Y closes the toner-outlet opening 7211 (see FIG. 15), the collected-toner outlet shutter 60Y of the drum unit 5Y closes the collected-toner outlet opening 591Y (see FIG. 10), and the collected-toner inlet shutter 75Y of the toner cartridge 6Y closes the collected-toner inlet opening 7410 (see FIG. 15).

Further, as shown in FIG. 3, the user may move the supporting member 11 from the inner position to the outer position and draw the toner cartridge 6Y outward from the main-body housing 2. Accordingly, the toner-outlet shutter 73Y and toner shutter 72Y (see FIG. 13) are disengaged from the toner-inlet shutter 57Y (see FIG. 5) of the drum unit 5Y, and the collected-toner outlet shutter 60Y and the outlet 59Y are disengaged from the collected-toner inlet shutter 75Y.

6. BENEFITS (1) According to the image forming apparatus 1, as shown in FIG. 2, in the state where the toner cartridge 6Y is mounted in the main-body housing 2, the transmission device 761Y of the shutter-driving member 76Y in the toner cartridge 6Y is enabled to transmit the power input thereto to the toner-inlet shutter 57Y and the collected-toner outlet shutter 60Y.

Therefore, in the state where the toner cartridge 6Y is mounted in the main-body housing 2, the user may open and close the toner-inlet shutter 57Y and the collected-toner outlet shutter 60Y by operating the shutter-driving member 76Y.

Accordingly, in the state where the toner cartridge 6Y is located at the correct position with respect to the toner-inlet shutter 57Y and the collected-toner outlet shutter 60Y, the toner-inlet shutter 57Y and the collected-toner outlet shutter 60Y may be opened or closed.

Therefore, scattering of the toner in the area around the toner-inlet opening 5511 and leakage of the toner from the collected-toner outlet opening 591Y may be prevented or reduced.

Moreover, in the state where the toner cartridge 6Y is mounted in the main-body housing 2, the user may move the transmission device 761Y from the side of the toner casing 71Y opposite to the transmission device 761Y by operating the operable device 762Y.

Moreover, in the state where the toner cartridge 6Y is mounted in the main-body housing 2, both the toner-inlet shutter 57Y and the collected-toner outlet shutter 60Y may be opened by the single action to move the transmission device 761Y from the first position (see FIG. 15) to the second position (see FIG. 16). Furthermore, in the state where the toner cartridge 6Y is mounted in the main-body housing 2, both the toner-inlet shutter 57Y and the collected-toner outlet shutter 60Y may be closed by the single action to move the transmission device 761Y from the second position (see FIG. 16) to the first position (see FIG. 15).

Therefore, the user may open and close the toner-inlet shutter 57Y and the collected-toner outlet shutter 60Y by the simple actions.

(2) According to the image forming apparatus 1, in the state where the toner cartridge 6Y is mounted in the main-body housing 2, the transmission member 61Y of the drum unit 5Y is enabled to move along with the transmission device 761Y of the toner cartridge 6Y.

Therefore, in the state where the toner cartridge 6Y is mounted in the main-body housing 2, by moving the transmission device 761Y of the toner cartridge 6Y, the transmission member 61 of the drum unit 5Y may open and close the toner-inlet shutter 57Y and the collected-toner outlet shutter 60Y.

(3) As shown in FIG. 10, the transmission member 61Y is a gear; therefore, with the transmission member 61Y meshing with the gear portion 572Y, the toner-inlet shutter 57Y may open and close the toner-inlet opening 5511 efficiently. Moreover, with the transmission member 61Y meshing with the gear portion 602Y, the collected-toner outlet shutter 60Y may open and close the collected-toner outlet opening 591Y efficiently.

(4) As shown in FIG. 6, according to the image forming apparatus 1, the developer casing 531Y is supported by the drum frame 54Y at the position between the first side plate 541A and the second side plate 541B movably with respect to the photosensitive drum 51Y. The drum unit 5Y has the toner-supplying opening 5512 (see FIG. 9), through which the toner may be supplied from the toner cartridge 6Y to the developer casing 531Y. The toner-supplying opening 5512 is formed in the toner tube 55Y, and the toner-inlet opening 5511 and the collected-toner outlet opening 591Y are located on the side of the first side plate 541A of the drum frame 54Y opposite to the developer casing 531Y.

Therefore, in the state where the drum unit 5Y is mounted in the main-body housing 2, when the toner cartridge 6Y is being mounted in the main-body housing 2, the toner cartridge 6Y may be located at the correct position with respect to the toner-inlet opening 5511 and the collected-toner outlet opening 591Y on the side of the first side plate 541A opposite to the developer casing 531Y, regardless of the position of the developer casing 531Y.

Accordingly, in the state where the drum unit 5Y is mounted in the main-body housing 2, the toner cartridge 6Y may be mounted in the main-body housing 2 easily.

(5) According to the image forming apparatus 1, in the state where the transmission device 761Y is located at the second position, if, for example, the user erroneously moves the toner cartridge 6Y in the demounting direction, the locking member 62Y may collide with the transmission device 761Y to restrict further movement of the toner cartridge 6Y in the demounting direction. Therefore, scattering of the toner in the area around the toner-inlet opening 5511 and leakage of the toner from the collected-toner outlet opening 591Y may be prevented or reduced.

(6) According to the image forming apparatus 1, the toner-outlet shutter 73Y is enabled to move along with the toner-inlet shutter 57Y of the drum unit 5Y in the state where the toner cartridge 6Y is mounted in the main-body housing 2. The toner-inlet shutter 57Y is enabled to move along with the collected-toner outlet shutter 60Y of the drum unit 5Y in the state where the toner cartridge 6Y is mounted in the main-body housing 2.

Therefore, in the state where the toner cartridge 6Y is mounted in the main-body housing 2, according to the movement of the shutter-driving member 76Y, the toner-outlet shutter 73Y may open and close in conjunction with the opening/closing movement of the toner-inlet shutter 57Y. Thus, in the state where the toner-outlet opening 7211 is located at the correct position with respect to the toner-inlet opening 5511, the toner-outlet opening 7211 may be opened and closed.

Further, in the state where the toner cartridge 6Y is mounted in the main-body housing 2, according to the movement of the shutter-driving member 76Y, the collected-toner inlet shutter 75Y may open and close in conjunction with the opening/closing movement of the collected-toner outlet shutter 60Y. Thus, in the state where the collected-toner inlet opening 7410 is located at the correct position with respect to the collected-toner outlet opening 591Y, the collected-toner inlet opening 7410 may be opened and closed.

In the state where the toner cartridge 6Y is mounted in the main-body housing 2, with the toner-inlet shutter 57Y located at the position to open the toner-inlet opening 5511, the toner-outlet shutter 73Y is located at the position to open the toner-outlet opening 7211. Therefore, leakage of the toner through the toner-outlet opening 7211 may be prevented or reduced.

In the state where the toner cartridge 6Y is mounted in the main-body housing 2, with the collected-toner outlet shutter 60Y located at the position to open the collected-toner outlet opening 591Y, the collected-toner inlet shutter 75Y is located at the position to open the collected-toner inlet opening 7410. Therefore, scattering of the toner in the area around the collected-toner inlet opening 7410 may be prevented or reduced.

(7) According to the image forming apparatus 1, in the state where the supporting member 11 is located at the inner position, the supporting member 11 allows the toner cartridge 6Y to be located and mounted correctly in the main-body housing 2 easily.

Further, in the state where the supporting member 11 is located at the outer position, the receiver member 12 may receive the collected toner that failed to enter the collected-toner inlet 74Y through the collected-toner inlet opening 7410.

While the invention has been described in conjunction with example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

For example, the image forming apparatus 1 may not necessarily have a plurality of drum units 5Y, 5M, 5C, 5K and a plurality of toner cartridges 6Y, 6M, 6C, 6K but may have a single drum unit, e.g., the drum unit 5K, and a single toner cartridge, e.g., the toner cartridge 6K, alone.

What is claimed is:

1. An image forming apparatus, comprising:

a main-body housing;

a drum unit located inside the main-body housing; and a toner cartridge mountable in and demountable from the main-body housing, wherein the drum unit includes:

a photosensitive drum;

a drum frame supporting the photosensitive drum rotatably;

a developing roller configured to supply toner to the photosensitive drum;

a toner-inlet shutter configured to open and close a toner-inlet opening through which the toner to be supplied to the photosensitive drum is receivable from the toner cartridge;

a cleaning member configured to clean a circumferential surface of the photosensitive drum; and a collected-toner outlet shutter configured to open and close a collected-toner outlet opening through which collected toner being the toner collected from the circumferential surface of the photosensitive drum by the cleaning member is dischargeable, wherein the toner cartridge includes:

a toner casing including:

a toner container configured to contain the toner to be supplied to the photosensitive drum; and a collected-toner container configured to contain the collected toner; and a shutter-driving member configured to, in a state where the toner cartridge is mounted in the main-body housing, drive the toner-inlet shutter and the collected-toner outlet shutter, the shutter-driving member including:

a transmission device configured to, in the state where the toner cartridge is mounted in the main-body housing, transmit power input thereto to the toner-inlet shutter and the collected-toner outlet shutter, the transmission device being movable between a first position, at which the transmission device locates the toner-inlet shutter at a position to close the toner-inlet opening and the collected-toner outlet shutter at a position to close the collected-toner outlet opening, and a second position, at which the transmission device locates the toner-inlet shutter at a position to open the toner-inlet opening and the collected-toner outlet shutter at a position to open the collected-toner outlet opening; and an operable device located on a side of the toner casing opposite to the transmission device, the operable device being configured to move the transmission device between the first position and the second position.

2. The image forming apparatus according to claim 1, wherein the drum unit further includes a transmission member connected with the toner-inlet shutter and with the collected-toner outlet shutter, the transmission member being, in the state where the toner cartridge is mounted in the main-body housing, movable along with the transmission device of the toner cartridge.

3. The image forming apparatus according to claim 2, wherein the transmission member is a gear, the toner-inlet shutter has a first gear portion, the first gear portion meshing with the transmission member, and the collected-toner outlet shutter has a second gear portion, the second gear portion meshing with the transmission member.

4. The image forming apparatus according to claim 3, wherein, in the state where the toner cartridge is mounted in the main-body housing, the gear is engaged with the transmission device.

5. The image forming apparatus according to claim 1, wherein the photosensitive drum is rotatable on an axis extending in a first direction, the drum frame includes:

a first side plate supporting a first end of the photosensitive drum in the first direction; and a second side plate supporting a second end of the photosensitive drum opposite to the first end in the first direction, the drum unit includes:

a developer casing located between the first side plate and the second side plate in the first direction, the developer casing being configured to contain the toner to be supplied to the photosensitive drum, the developer casing supporting the developing roller, the developer casing being movable with respect to the photosensitive drum; and a toner tube having a toner-supplying opening, the toner-supplying opening being configured to supply the toner to the developer casing there-through, the toner tube allowing the toner to travel there-through from the toner-inlet opening to the toner-supplying opening, the toner supplying opening is located on a same side of the first side plate of the drum frame as the developer casing, and the toner-inlet opening and the collected-toner outlet opening are located on a side of the first side plate of the drum frame opposite to the developer casing.

6. The image forming apparatus according to claim 1, wherein the shutter-driving member is a shaft connecting the transmission device and the operable device, the shaft penetrating the toner casing.

7. The image forming apparatus according to claim 1, wherein the drum unit further includes a locking member, the locking member being configured to, in the state where the toner cartridge is mounted in the main-body housing, with the transmission device being located at the second position, and in a case where the toner cartridge is moved in a demounting direction, in which the toner cartridge is demountable from the main-body housing, collide with the transmission device to restrict further movement of the toner cartridge in the demounting direction.

8. The image forming apparatus according to claim 7, wherein the locking member has a through-hole through which the transmission device located at the first position is configured to pass and the transmission device located at the second position is configured not to pass.

9. The image forming apparatus according to claim 8, wherein the through-hole extends in a particular direction intersecting with a pass-through direction in which the transmission device passes through the through-hole, and the transmission device has a protrusion protruding in a direction intersecting with the pass-through direction and with the particular direction, in a state where the drum unit and the toner cartridge are mounted in the main-body housing with the locking member being located at the second position.

10. The image forming apparatus according to claim 1, wherein the toner cartridge further includes:

a toner-outlet shutter configured to, in the state where the toner cartridge is mounted in the main-body housing, open and close a toner-outlet opening through which the toner in the toner container is dischargeable toward the toner-inlet opening of the drum unit, the toner-outlet shutter being movable along with the toner-inlet shutter of the drum unit in the state where the toner cartridge is mounted in the main-body housing; and a collected-toner inlet shutter configured to, in the state where the toner cartridge is mounted in the main-body housing, open and close a collected-toner inlet opening through which the toner discharged from the collected-toner outlet opening is receivable, the collected-toner inlet shutter being movable along with the collected-toner outlet shutter of the drum unit in the state where the toner cartridge is mounted in the main-body housing, the toner-outlet shutter engages with the toner-inlet shutter, the toner-outlet shutter being configured to be located at a position to close the toner-outlet opening in a state where the toner-inlet shutter is located at the position to close the toner-inlet opening, the toner-outlet shutter being configured to be located at a position to open the toner-outlet opening in a state where the toner-inlet shutter is located at the position to open the toner-inlet opening, and the collected-toner inlet shutter engages with the collected-toner outlet shutter, the collected-toner inlet shutter being configured to be located at a position to close the collected-toner inlet opening in a state where the collected-toner outlet shutter is located at the position to close the collected-toner outlet opening, the collected-toner inlet shutter being configured to be located at a position to open the collected-toner inlet opening in a state where the collected-toner outlet shutter is located at the position to open the collected-toner outlet opening.

11. The image forming apparatus according to claim 10, wherein the photosensitive drum is rotatable on an axis extending in a first direction, and the toner cartridge is movable in the first direction with respect to the drum unit to be mounted in and demountable from the main-body housing.

12. The image forming apparatus according to claim 11, further comprising a supporting member configured to support the toner cartridge, the supporting member being movable in the first direction between an inner position at which the supporting member supports and locates the toner cartridge inside the main-body housing, and an outer position at which the supporting member supports and locates the toner cartridge outside the main-body housing.

13. The image forming apparatus according to claim 12, further comprising a receiver member, the receiver member being located below the collected-toner outlet opening of the drum unit located inside the main-body housing, the receiver member being configured to receive the collected toner failing to enter the toner cartridge through the collected-toner inlet opening, wherein in a state where the supporting member is located at the inner position, the supporting member is located between the collected-toner outlet opening and the receiver member in a vertical direction, and in a state where the supporting member is located at the outer position, the supporting member is not located between the collected-toner outlet opening and the receiver member in the vertical direction.

14. The image forming apparatus according to claim 1, wherein the photosensitive drum is rotatable on an axis extending in a first direction, and the drum unit is a drum cartridge mountable in and demountable from the main-body housing in the first direction.

* * * * *